(12) United States Patent
Hirai et al.

(10) Patent No.: US 9,503,980 B2
(45) Date of Patent: Nov. 22, 2016

(54) START SIGNAL GENERATING APPARATUS

(71) Applicants: Akihito Hirai, Tokyo (JP); Yoshinori Takahashi, Tokyo (JP); Eiji Taniguchi, Tokyo (JP)

(72) Inventors: Akihito Hirai, Tokyo (JP); Yoshinori Takahashi, Tokyo (JP); Eiji Taniguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 159 days.

(21) Appl. No.: 14/369,028

(22) PCT Filed: Feb. 25, 2013

(86) PCT No.: PCT/JP2013/054746
§ 371 (c)(1),
(2) Date: Jun. 26, 2014

(87) PCT Pub. No.: WO2013/133069
PCT Pub. Date: Sep. 12, 2013

(65) Prior Publication Data
US 2014/0376434 A1   Dec. 25, 2014

(30) Foreign Application Priority Data

Mar. 7, 2012  (JP) ................. 2012-050484

(51) Int. Cl.
*H04W 52/02* (2009.01)
*H04B 17/318* (2015.01)
*H04B 1/16* (2006.01)

(52) U.S. Cl.
CPC .......... *H04W 52/0225* (2013.01); *H04B 1/16* (2013.01); *H04B 17/318* (2015.01); *H04W 52/0229* (2013.01); *H04W 52/0245* (2013.01)

(58) Field of Classification Search
None
See application file for complete search history.

(56) References Cited

U.S. PATENT DOCUMENTS

| 8,374,111 | B2* | 2/2013 | Bekritsky | ......... H04W 52/0229 370/311 |
| 2005/0152317 | A1 | 7/2005 | Awater et al. | |
| 2006/0073857 | A1* | 4/2006 | Hanabusa | ............ G07B 15/063 455/572 |
| 2008/0186076 | A1 | 8/2008 | Kawama | |
| 2009/0310524 | A1 | 12/2009 | Katsube et al. | |

(Continued)

FOREIGN PATENT DOCUMENTS

| EP | 1 598 945 A2 | 11/2005 |
| JP | H10-242885 A | 9/1998 |

(Continued)

OTHER PUBLICATIONS

International Search Report; PCT/JP2013/054746; May 28, 2013.

(Continued)

*Primary Examiner* — Andrew Lai
*Assistant Examiner* — Jamaal Henson
(74) *Attorney, Agent, or Firm* — Studebaker & Brackett PC

(57) ABSTRACT

Besides a time constant circuit 5 that imposes a frequency limit on a wireless signal detected by a power detecting circuit 4 at a preset time constant Ta, there is provided a time constant circuit 8 that imposes a frequency limit on the wireless signal at a time constant Tb greater than the time constant Ta. When the signal level of an intermittent operation signal supplied from a signal input terminal 1 is H level or when a threshold processing circuit 6 decides that the level of the wireless signal is higher than a threshold Th, a logic unit 3 supplies a control signal that instructs starting to the power detecting circuit 4, time constant circuits 5 and 8 and threshold processing circuits 6 and 9.

8 Claims, 15 Drawing Sheets

(56) References Cited

U.S. PATENT DOCUMENTS

2010/0150042 A1 6/2010 Oh et al.
2010/0240319 A1* 9/2010 Matsuo ............. H04W 52/0225
455/68
2011/0317601 A1 12/2011 Bekritsky et al.

FOREIGN PATENT DOCUMENTS

| JP | 2002-217764 A | 8/2002 |
|---|---|---|
| JP | 2006-050333 A | 2/2006 |
| JP | 2009-111818 A | 5/2009 |
| JP | 2012-034287 A | 2/2012 |

OTHER PUBLICATIONS

The extended European search report issued by the European Patent Office on Oct. 23, 2015, which corresponds to European Patent Application No. 13757548.6-1855 and is related to U.S. Appl. No. 14/369,028.

* cited by examiner

START SIGNAL GENERATING APPARATUS

TECHNICAL FIELD

The present invention relates to a start signal generating apparatus which is mounted on a wireless communication apparatus, for example, and is capable of reducing power consumption by carrying out intermittent operations at fixed intervals and by starting a post-stage communication circuit and the like so long as a wireless signal is present.

BACKGROUND ART

FIG. 14 is a block diagram showing a configuration of a conventional start signal generating apparatus.

The start signal generating apparatus of FIG. 14 comprises a power detecting circuit 103, a time constant circuit 104 and a threshold processing circuit 105. The power detecting circuit 103, time constant circuit 104 and threshold processing circuit 105 are turned on only when the signal level of an intermittent operation signal input to a signal input terminal 101 is H level and start their processing.

Accordingly, when the signal level of the intermittent operation signal is L level, they enter into a suspend mode, thereby being able to reduce power consumption.

FIG. 15 is a timing chart showing operation timing of the start signal generating apparatus of FIG. 14.

The operation of the start signal generating apparatus of FIG. 14 will now be described with reference to the timing chart of FIG. 15.

Although the power detecting circuit 103 is placed in a suspend mode while the signal level of the intermittent operation signal input through the signal input terminal 101 is L level, when the signal level of the intermittent operation signal becomes H level, it starts the detection processing of the wireless signal input through the signal input terminal 102.

As for the time constant circuit 104 also, although it is placed in a suspend mode just as the power detecting circuit 103 while the signal level of the intermittent operation signal input through the signal input terminal 101 is L level, it starts the processing when the signal level of the intermittent operation signal becomes H level.

More specifically, when the signal level of the intermittent operation signal becomes H level, the time constant circuit 104 imposes a frequency limit on the wireless signal detected by the power detecting circuit 103 at a preset time constant as shown in FIG. 15, and supplies the frequency-limited wireless signal to the threshold processing circuit 105.

Here, the magnitude of the time constant set by the time constant circuit 104 will determine the response speed and detection accuracy of the start signal generating apparatus.

More specifically, to increase the response speed (to achieve sharp rising characteristics), a small time constant is to be set. However, since a small time constant will broaden a limitable frequency band, it will increase a noise band and deteriorate the detection accuracy because of insufficient amount of attenuation of the harmonic components. As a result, the probability of a malfunction increases.

On the other hand, although increasing the time constant will enable improving the detection accuracy because it can limit the noise band and reduce the harmonic components sufficiently, it will reduce the response speed. In addition, since it requires to increase the time in which the signal level of the intermittent operation signal becomes H level, it will hamper reducing the power consumption of the power detecting circuit 103 and the like.

As for the threshold processing circuit 105 also, while the signal level of the intermittent operation signal input through the signal input terminal 101 is L level, although it is in the suspend mode just as the power detecting circuit 103, it starts its processing when the signal level of the intermittent operation signal becomes H level.

More specifically, when the signal level of the intermittent operation signal becomes H level, the threshold processing circuit 105 compares the level of the wireless signal on which the frequency limit is imposed by the time constant circuit 104 with a prescribed threshold as shown in FIG. 15, and decides on whether the level of the wireless signal is higher than the prescribed threshold or not.

If the threshold processing circuit 105 decides that the level of the wireless signal is higher than the prescribed threshold, it starts a post-stage communication circuit 106.

Incidentally, in addition to the foregoing start signal generating apparatus, although the following Patent Document 1 discloses a wireless receiving apparatus that reduces the power consumption by controlling the operation of a circuit in accordance with the signal level of the received signal, it does not intend to reduce the power consumption by carrying out the intermittent operation at fixed intervals. Accordingly, it must always monitor the signal level of the received signal, and hence it cannot reduce the power consumption sufficiently.

PRIOR ART DOCUMENT

Patent Document

Patent Document 1: Japanese Patent Laid-Open No. 2006-50333 (Paragraph [0016]).

DISCLOSURE OF THE INVENTION

Problems to be Solved by the Invention

In the conventional start signal generating apparatus with the foregoing configuration, the magnitude of the time constant set by the time constant circuit 104 determines the response speed and detection accuracy. In this case, it has a problem in that although reducing the time constant enables increasing the response speed, it will deteriorate the detection accuracy, and that although increasing the time constant enables improving the detection accuracy, it will reduce the response speed.

The present invention is implemented to solve the foregoing problems. Therefore it is an object of the present invention to provide a start signal generating apparatus capable of reducing power consumption without reducing the response speed or deteriorating the detection accuracy.

Means for Solving the Problems

A start signal generating apparatus in accordance with the present invention comprises: a wireless signal detecting circuit that executes detection processing of a wireless signal; a first time constant circuit that imposes a frequency limit on the wireless signal detected by the wireless signal detecting circuit at a preset time constant; a first level decision circuit that decides on whether a level of the wireless signal on which the frequency limit is imposed by the first time constant circuit is higher than a prescribed threshold or not; a second time constant circuit that imposes a frequency limit on the wireless signal detected by the wireless signal detecting circuit at a time constant greater than the time constant set in the first time constant circuit; and a second level decision circuit that decides on whether a level of the wireless signal on which the frequency limit is imposed by the second time constant circuit is higher than a prescribed threshold or not, wherein an intermittent operation control circuit starts the wireless signal detecting circuit, the first and second time constant circuits and the first and second level decision circuits, when an intermittent operation signal that instructs starting is input or when the first level decision circuit decides that the level of the wireless signal is higher than the prescribed threshold.

Advantages of the Invention

According to the present invention, it is configured in such a manner that it comprises, in addition to the first time constant circuit that imposes the frequency limit on the wireless signal detected by the wireless signal detecting circuit at the preset time constant, and the second time constant circuit that imposes the frequency limit on the wireless signal detected by the wireless signal detecting circuit at the time constant greater than the time constant set in the first time constant circuit, wherein the intermittent operation control circuit starts the wireless signal detecting circuit, the first and second time constant circuits and the first and second level decision circuits, when an intermittent operation signal that instructs starting is input or when the first level decision circuit decides that the level of the wireless signal is higher than the prescribed threshold. Accordingly, it offers an advantage of being able to reduce the power consumption without bringing about the low response speed or the deterioration in the detection accuracy.

BEST MODE FOR CARRYING OUT THE INVENTION

The best mode for carrying out the invention will now be described with reference to the accompanying drawings to explain the present invention in more detail.

Embodiment 1

Figure 1:
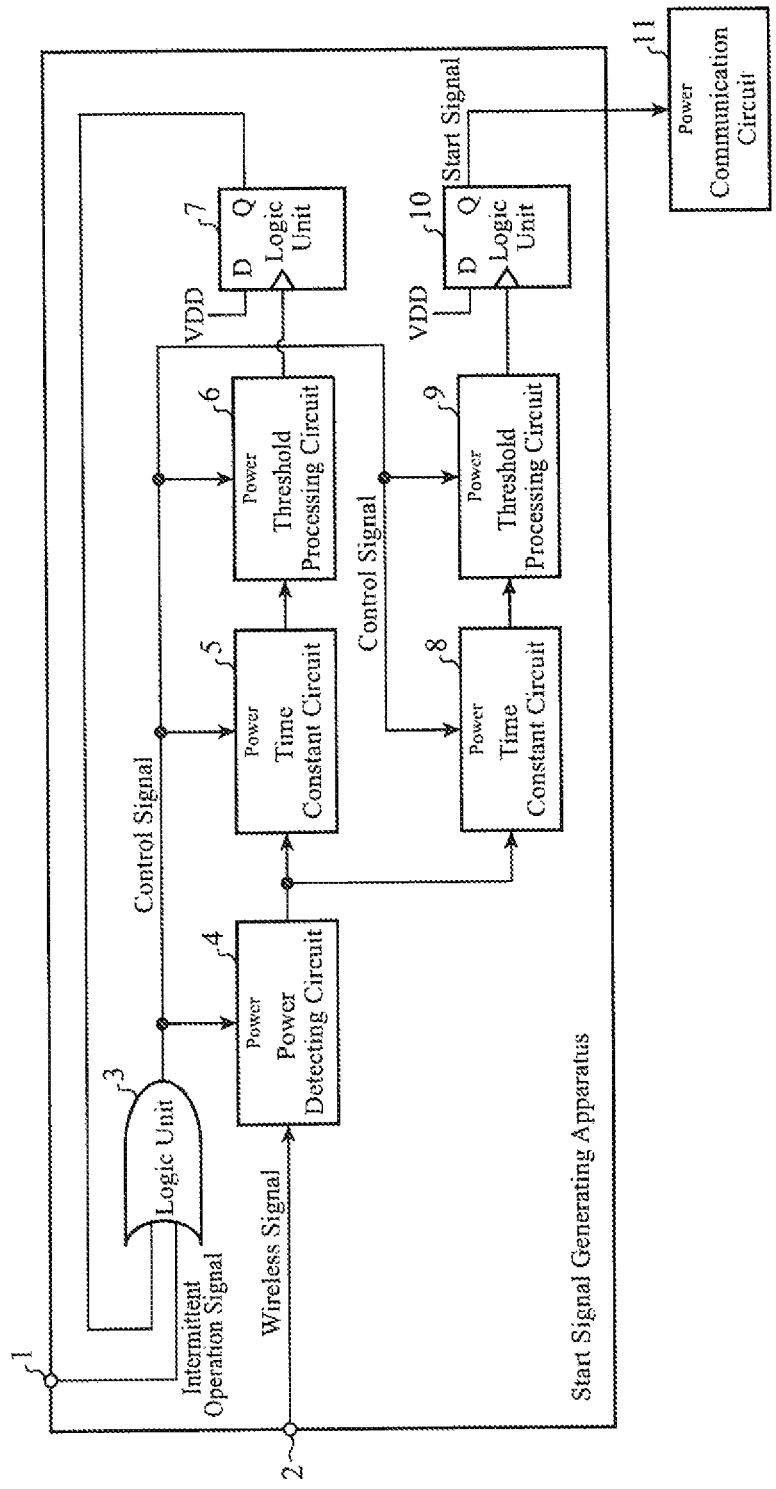
FIG. 1 is a block diagram showing a configuration of a start signal generating apparatus of an embodiment 1 in accordance with the present invention.
Figure 2:
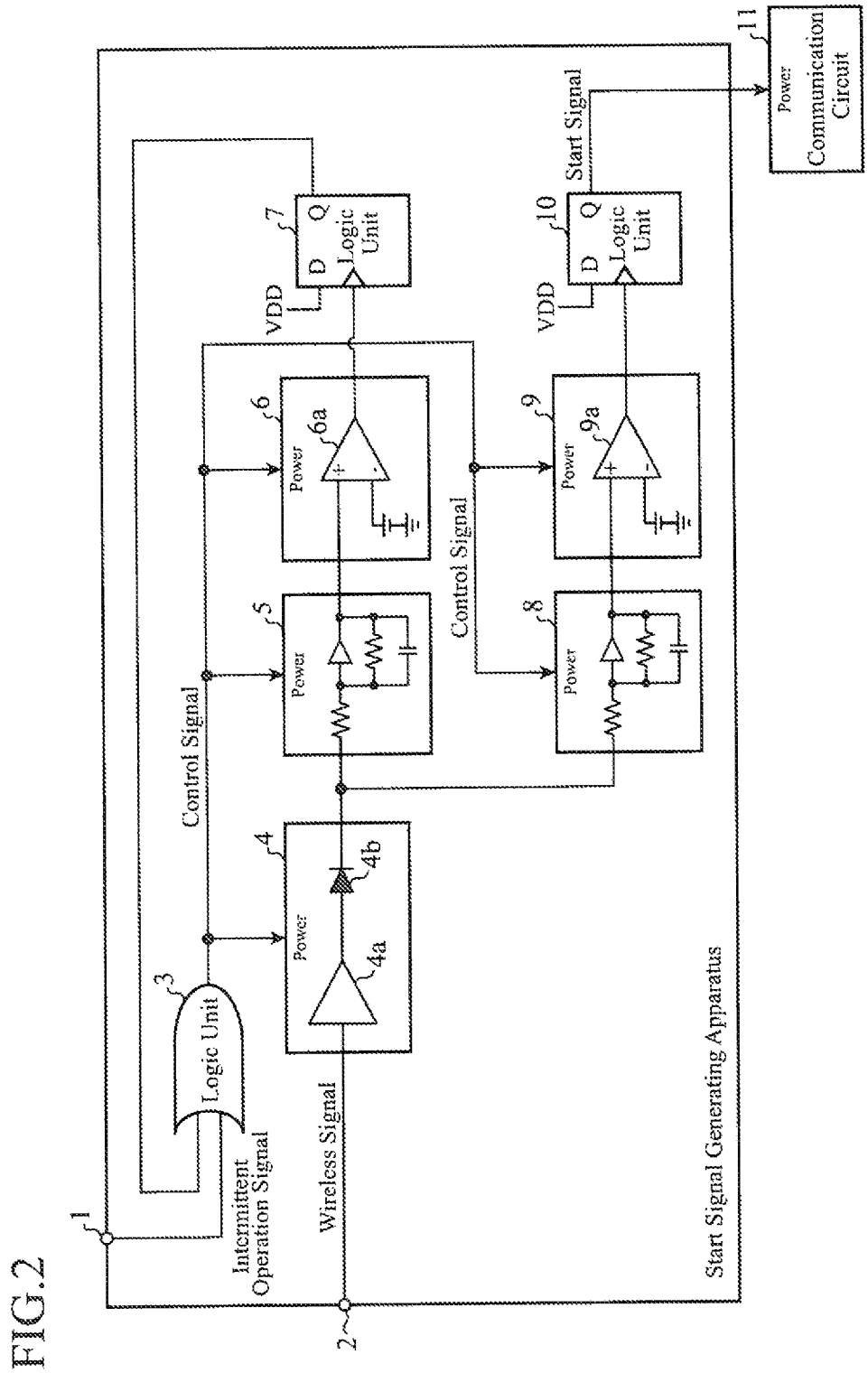
FIG. 2 is a circuit diagram showing an internal configuration of each circuit in the start signal generating apparatus of FIG. 1.

FIG. 1 is a block diagram showing a configuration of a start signal generating apparatus of an embodiment 1 in accordance with the present invention; and FIG. 2 is a circuit diagram showing an internal configuration of each circuit of the start signal generating apparatus of FIG. 1.

In FIG. 1 and FIG. 2, a signal input terminal 1 is a terminal for receiving an intermittent operation signal that instructs starting (a signal with a signal level of H level) from outside.

A signal input terminal 2 is a terminal for receiving a wireless signal from outside.

A logic unit 3, which is comprised of an OR circuit, for example, supplies, when the signal level of the intermittent operation signal input through the signal input terminal 1 is placed at H level or the signal level of the output signal of a logic unit 7 is placed at H level, a control signal that instructs starting to a power detecting circuit 4, time constant circuits 5 and 8 and threshold processing circuits 6 and 9.

The power detecting circuit 4, which is comprised of an amplifier 4a and a diode 4b, is a wireless signal detecting circuit that stays in the suspend mode unless the logic unit 3 outputs the control signal that instructs starting, and that starts the detection processing of the wireless signal input through the signal input terminal 2 when receiving the control signal that instructs starting from the logic unit 3.

The time constant circuit 5, which constitutes a first time constant circuit and is comprised of an active filter, for example, stays in the suspend mode unless the logic unit 3 supplies the control signal that instructs starting, but starts its processing when receiving the control signal that instructs starting from the logic unit 3.

More specifically, the time constant circuit 5 is a circuit that imposes, when receiving the control signal that instructs starting from the logic unit 3, a frequency limit on the wireless signal detected by the power detecting circuit 4 at a preset time constant Ta (time constant Ta is set at a small value that will cause the output signal of the time constant circuit 5 to rise sharply enough while the signal level of the intermittent operation signal is H level).

A threshold processing circuit 6, which is comprised of a comparator 6a or the like, for example, stays in the suspend mode unless the logic unit 3 supplies the control signal that instructs starting, and starts its processing when it receives the control signal that instructs starting from the logic unit 3.

More specifically, the threshold processing circuit 6 is a first level decision circuit that compares, when receiving the control signal that instructs starting from the logic unit 3, the level of the wireless signal on which the frequency limit is imposed by the time constant circuit 5 with the threshold Th, and decides on whether the level of the wireless signal is higher than the threshold Th or not.

The logic unit 7, which is comprised of a flip-flop, for example, supplies the logic unit 3 with an H level signal for a fixed time period (or a time period until a reset signal is input from the outside) when the threshold processing circuit 6 decides that the level of the wireless signal is higher than the threshold Th.

Incidentally, the logic units 3 and 7 constitute an intermittent operation control circuit.

The time constant circuit 8, which constitutes a second time constant circuit and is comprised of an active filter, for example, stays in the suspend mode unless the logic unit 3 supplies the control signal that instructs starting, but starts its processing when receiving the control signal that instructs starting from the logic unit 3.

More specifically, the time constant circuit 8 is a circuit that imposes, when receiving the control signal that instructs starting from the logic unit 3, a frequency limit on the wireless signal detected by the power detecting circuit 4 at a time constant Tb greater than the time constant Ta set in the time constant circuit 5 (time constant Tb is set at a sufficiently large value compared with the frequency of the wireless signal and has a relationship of Ta<<Tb).

The threshold processing circuit 9, which is comprised of a comparator 9a or the like, for example, stays in the suspend mode unless the logic unit 3 supplies the control signal that instructs starting, but starts its processing when it receives the control signal that instructs starting from the logic unit 3.

More specifically, the threshold processing circuit 9 is a second level decision circuit that compares, when receiving the control signal that instructs starting from the logic unit 3, the level of the wireless signal on which the frequency limit is imposed by the time constant circuit 8 with the threshold Th, and decides on whether the level of the wireless signal is higher than the threshold Th or not.

A logic unit 10, which is comprised of a flip-flop, for example, is a start signal output circuit that supplies, when the threshold processing circuit 9 decides that the level of the wireless signal is higher than the threshold Th, a start signal to a communication circuit 11 for a fixed time period (or a time period until a reset signal is input from outside).

The communication circuit 11 is a circuit that starts its communication processing when receiving the start signal from the logic unit 10.

Although FIG. 1 shows an example in which the communication circuit 11 is started by the start signal generating apparatus, it is only an example, and a configuration is also possible in which a circuit other than the communication circuit 11 is started.

Next, the operation will be described.

Figure 3:
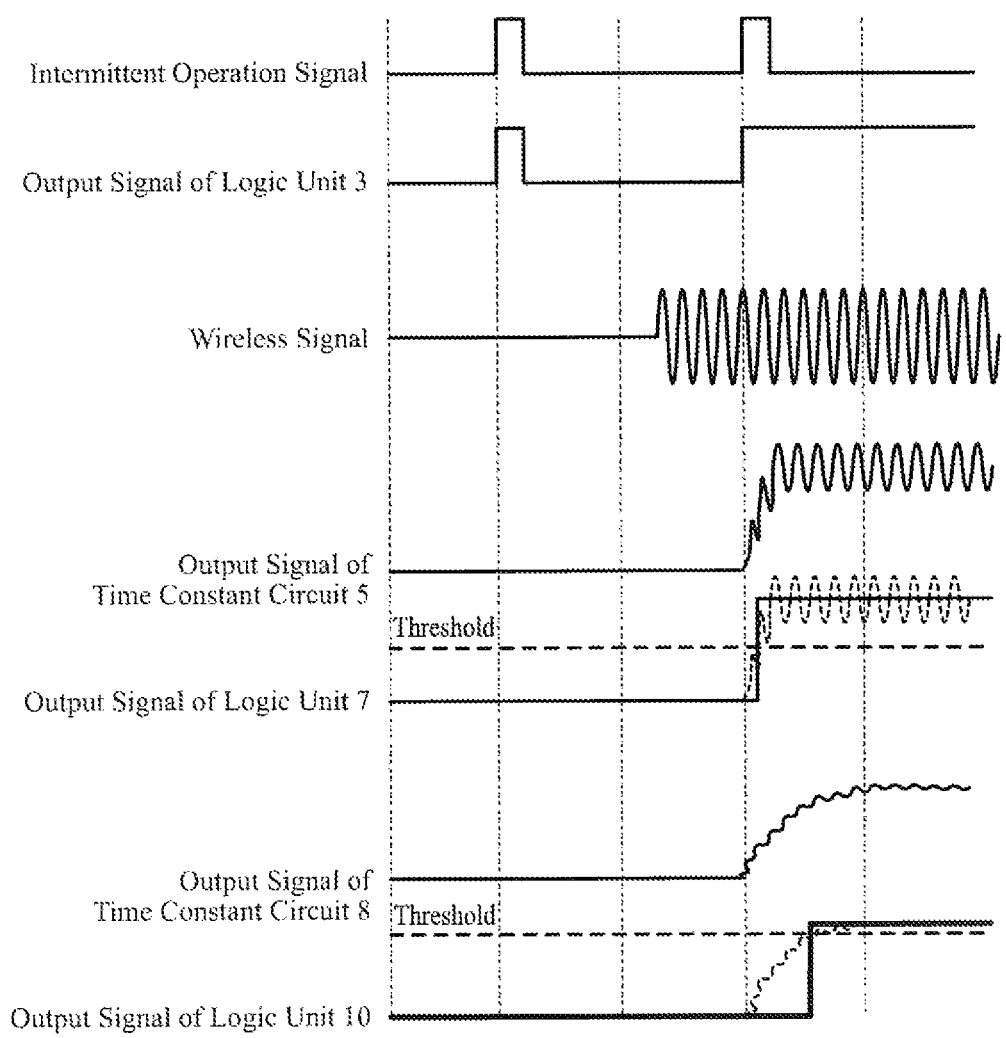
FIG. 3 is a timing chart showing the operation timing of the start signal generating apparatus of FIG. 1.

FIG. 3 is a timing chart showing the operation timing of the start signal generating apparatus of FIG. 1. Referring to the timing chart of FIG. 3, the operation of the start signal generating apparatus of FIG. 1 will now be described.

When the signal level of the intermittent operation signal input through the signal input terminal 1 changes from L level to H level, the logic unit 3 supplies the power detecting circuit 4, the time constant circuits 5 and 8 and the threshold processing circuits 6 and 9 with the control signal that instructs starting.

At the beginning of the processing, although the signal level of the output signal of the logic unit 7 is L level, the logic unit 3 supplies the power detecting circuit 4, the time constant circuits 5 and 8 and the threshold processing circuits 6 and 9 with the control signal that instructs starting when the signal level of the output signal of the logic unit 7 becomes H level, as well.

Although the power detecting circuit 4 is placed in the suspend mode unless the logic unit 3 outputs the control signal that instructs starting, when it receives the control signal that instructs starting from the logic unit 3, it starts the detection processing of the wireless signal input through the signal input terminal 2.

As for the time constant circuit 5, although it is placed in the suspend mode just as the power detecting circuit 4 unless the logic unit 3 outputs the control signal that instructs starting, when it receives the control signal that instructs starting from the logic unit 3, it starts its processing.

More specifically, when receiving the control signal that instructs starting from the logic unit 3, the time constant circuit 5 imposes the frequency limit on the wireless signal detected by the power detecting circuit 4 at the preset time constant Ta as shown in FIG. 3, and supplies the frequency-limited wireless signal to the threshold processing circuit 6.

Here, since the preset time constant Ta is such a small value that will raise the output signal of the time constant circuit 5 sharply enough within the time period while the signal level of the intermittent operation signal is H level as described above, it can increase the response speed. In addition, even if the time length of the H level of the intermittent operation signal is short, the time constant circuit 5 can impose a frequency limit on the wireless signal detected by the power detecting circuit 4. Accordingly, unlike the conventional configuration, since it does not have to maintain the signal level of the intermittent operation signal at H level for a long time, it can reduce the power consumption of the power detecting circuit 4 and the like.

As for the threshold processing circuit 6, although it is placed in the suspend mode just as the power detecting circuit 4 unless the logic unit 3 outputs the control signal that instructs starting, when it receives the control signal that instructs starting from the logic unit 3, it starts its processing.

More specifically, when receiving the control signal that instructs starting from the logic unit 3, the threshold processing circuit 6 compares the level of the wireless signal on which the frequency limit is imposed by the time constant circuit 5 with the threshold Th, and decides on whether the level of the wireless signal is higher than the threshold Th or not.

When the threshold processing circuit 6 decides that the level of the wireless signal is higher than the threshold Th, the logic unit 7 supplies the logic unit 3 with an H level signal for a fixed time period (or for a time period until the reset signal is input from outside) as shown in FIG. 3. The fixed time period is a sufficiently long as compared with the frequency of the wireless signal.

When the signal level of the output signal of the logic unit 7 becomes H level, the logic unit 3 supplies the power detecting circuit 4, the time constant circuits 5 and 8 and the threshold processing circuits 6 and 9 with the control signal that instructs starting continuously during the period of H level as shown in FIG. 3.

As for the time constant circuit 8, although it is placed in the suspend mode just as the power detecting circuit 4 unless the logic unit 3 outputs the control signal that instructs starting, when it receives the control signal that instructs starting from the logic unit 3, it starts its processing.

More specifically, when receiving the control signal that instructs starting from the logic unit 3, the time constant circuit 8 imposes the frequency limit on the wireless signal detected by the power detecting circuit 4 at the preset time constant Tb as shown in FIG. 3, and supplies the frequency-limited wireless signal to the threshold processing circuit 9.

Here, since the preset time constant Tb is set at a sufficiently large value as compared with the frequency of the wireless signal as mentioned above, the response time will be slow and hence the frequency-limited wireless signal cannot rise sufficiently during the time when the signal level of the intermittent operation signal is placed at H level.

However, when the threshold processing circuit 6 decides that the level of the wireless signal is higher than the threshold Th, the logic unit 3 outputs the control signal that instructs starting for a sufficiently long time as compared with the frequency of the wireless signal. Accordingly, even if the response time is slow, the frequency-limited wireless signal can rise sufficiently.

In this way, although the time constant Tb which is set at a large value will delay the response time, since it can reduce fluctuations of the value after the convergence, it can improve the detection accuracy of the wireless signal.

As for the threshold processing circuit 9, although it is placed in the suspend mode just as the power detecting circuit 4 unless the logic unit 3 outputs the control signal that instructs starting, when it receives the control signal that instructs starting from the logic unit 3, it starts its processing.

More specifically, when receiving the control signal that instructs starting from the logic unit 3, the threshold processing circuit 9 compares the level of the wireless signal on which the frequency limit is imposed by the time constant circuit 8 with the threshold Th, and decides on whether the level of the wireless signal is higher than the threshold Th or not.

When the threshold processing circuit 9 decides that the level of the wireless signal is higher than the threshold Th, the logic unit 10 supplies the communication circuit 11 with a start signal (H level signal) for a fixed time period (or for a time period until the reset signal is input from outside).

This will start the communication circuit 11.

As is clear from the description above, according to the present embodiment 1, it is configured in such a manner that it comprises, in addition to the time constant circuit 5 which imposes the frequency limit on the wireless signal detected by the power detecting circuit 4 at the preset time constant Ta, the time constant circuit 8 which imposes the frequency limit on the wireless signal detected by the power detecting circuit 4 at the time constant Tb greater than the time constant Ta set in the time constant circuit 5, and that the logic unit 3 supplies the power detecting circuit 4, the time constant circuits 5 and 8 and the threshold processing circuits 6 and 9 with the control signal that instructs starting when the signal level of the intermittent operation signal input through the signal input terminal 1 is H level, or when the threshold processing circuit 6 decides that the level of the wireless signal is higher than the threshold Th. Accordingly, it offers an advantage of being able to reduce the power consumption without reducing the response speed or deteriorating the detection accuracy.

More specifically, in an ordinary intermittent operation, the time constant circuit 5 which has the small time constant Ta and is capable of a high-speed response carries out rough detection of the wireless signal, thereby being able to shorten the time period in which the signal level of the intermittent operation signal is H level. In addition, when the wireless signal is present, the time constant circuit 8 with the large time constant Tb detects the wireless signal at high accuracy, thereby being able to start the communication circuit 11.

Embodiment 2

Although the foregoing embodiment 1 shows an example that comprises two time constant circuits and two threshold processing circuits, a configuration is also possible which comprises N time constant circuits and N threshold processing circuits (N is an integer not less than three).

The present embodiment 2 shows an example where N=3.

Figure 4:
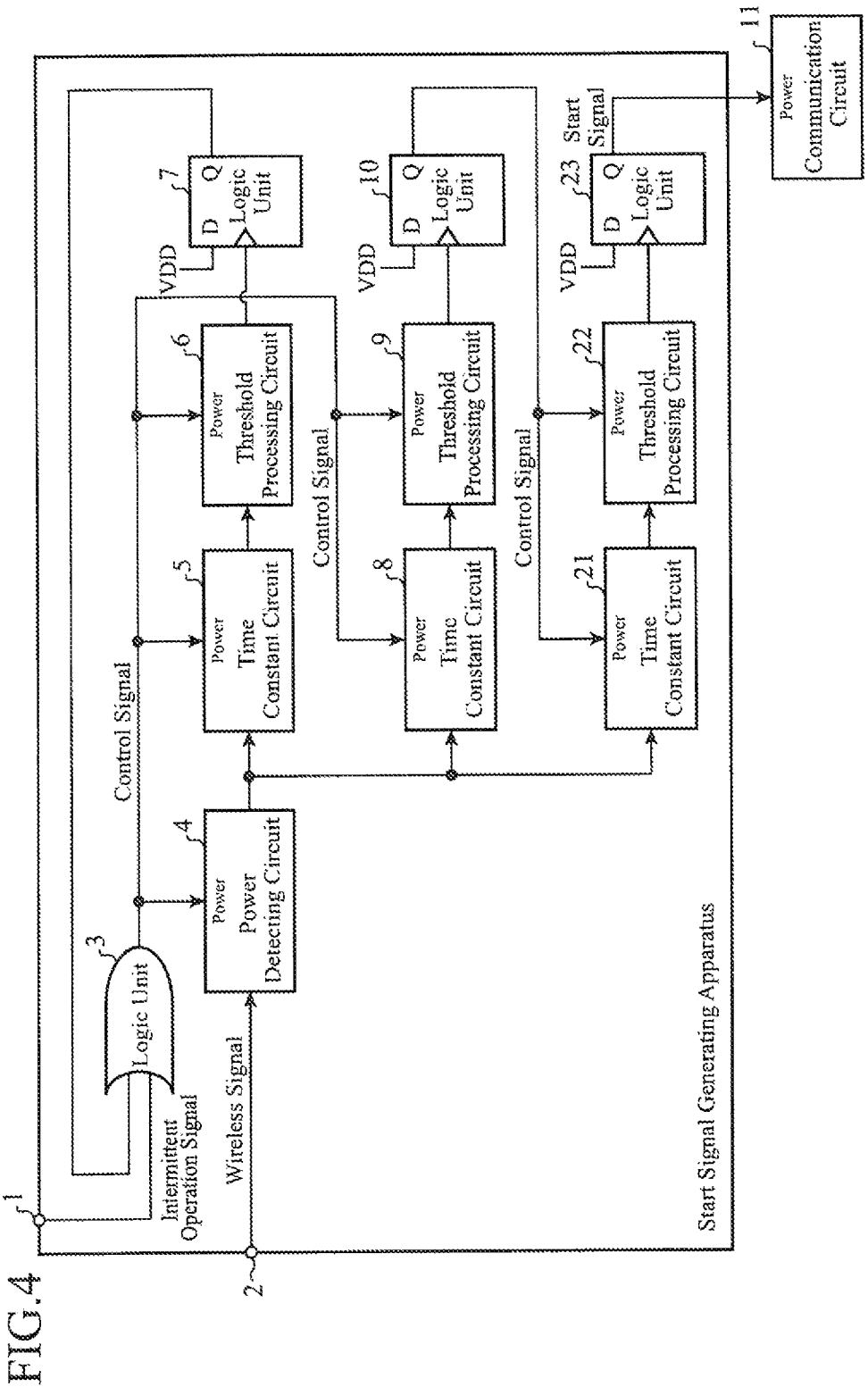
FIG. 4 is a block diagram showing a configuration of a start signal generating apparatus of an embodiment 2 in accordance with the present invention.

FIG. 4 is a block diagram showing a configuration of a start signal generating apparatus of an embodiment 2 in accordance with the present invention. In FIG. 4, since the same reference numerals as those of FIG. 1 designate the same or like components, their description will be omitted.

A time constant circuit 21, which constitutes a third time constant circuit and is comprised of an active filter or the like, for example, is placed in the suspend mode when the signal level of the output signal of the logic unit 10 is L level, but starts its processing when the signal level of the output signal of the logic unit 10 becomes H level.

More specifically, the time constant circuit 21 is a circuit that imposes, when the signal level of the output signal of the logic unit 10 becomes H level, a frequency limit on the wireless signal detected by the power detecting circuit 4 at a time constant Tc greater than the time constant Tb set in the time constant circuit 8 (Tb<Tc).

A threshold processing circuit 22, which is comprised of a comparator, for example, is placed in the suspend mode when the signal level of the output signal of the logic unit 10 is L level, but starts its processing when the signal level of the output signal of the logic unit 10 becomes H level.

More specifically, the threshold processing circuit 22 is a third level decision circuit that compares, when the signal level of the output signal of the logic unit 10 becomes H level, the level of the wireless signal on which the frequency limit is imposed by the time constant circuit 21 with the threshold Th, and decides on whether the level of the wireless signal is higher than the threshold Th or not.

The logic unit 23, which is comprised of a flip-flop, for example, is a start signal output circuit that supplies the start signal to the communication circuit 11 for a fixed time period (or for a time period until the reset signal is input from outside) when the threshold processing circuit 22 decides that the level of the wireless signal is higher than the threshold Th.

Next, the operation will be described.

Since the present embodiment 2 is the same as the foregoing embodiment 1 except that it comprises the time constant circuit 21, threshold processing circuit 22 and logic unit 23, the processing contents of the time constant circuit 21, threshold processing circuit 22 and logic unit 23 will now be described.

In the present embodiment 2, however, the output signal of the logic unit 10 is supplied not to the communication circuit 11, but to the time constant circuit 21 and threshold processing circuit 22.

Unless the time constant circuit 21 receives the H level output signal from the logic unit 10, although it is placed in the suspend mode just as the power detecting circuit 4, if it receives the H level output signal from the logic unit 10, it starts its processing.

More specifically, when the time constant circuit 21 receives the H level output signal from the logic unit 10, it imposes a frequency limit on the wireless signal detected by the power detecting circuit 4 at the preset time constant Tc, and supplies the frequency-limited wireless signal to the threshold processing circuit 22.

Here, the preset time constant Tc is still greater than the time constant Tb set in the time constant circuit 8. Accordingly, the time constant circuit 21 has smaller fluctuations in the value after convergence than the time constant circuit 8, thereby further improving the detection accuracy of the wireless signal.

As for the threshold processing circuit 22, unless it receives the H level output signal from the logic unit 10, although it is placed in the suspend mode just as the power detecting circuit 4, it starts its processing when it receives the H level output signal from the logic unit 10.

More specifically, when the threshold processing circuit 22 receives the H level output signal from the logic unit 10, it compares the level of the wireless signal on which the frequency limit is imposed by the time constant circuit 21 with the threshold Th, and decides on whether the level of the wireless signal is higher than the threshold Th or not.

If the threshold processing circuit 22 decides that the level of the wireless signal is higher than the threshold Th, the logic unit 23 supplies the start signal (H level signal) to the communication circuit 11 for the fixed time period (or for the time period until the reset signal is input from outside).

This will activate the communication circuit 11.

As is clear from the above, according to the present embodiment 2, it is configured in such a manner that it comprises the time constant circuit 21 which imposes, when the signal level of the output signal of the logic unit 10 becomes H level, the frequency limit on the wireless signal detected by the power detecting circuit 4 at the time constant Tc greater than the time constant Tb set in the time constant circuit 8 (Tb<Tc); and the threshold processing circuit 22 which compares, when the signal level of the output signal of the logic unit 10 becomes H level, the level of the wireless signal on which the frequency limit is imposed by the time constant circuit 21 with the threshold Th, and decides on whether the level of the wireless signal is higher than the threshold Th or not, and that the logic unit 23 supplies the start signal to the communication circuit 11 when the threshold processing circuit 22 decides that the level of the wireless signal is higher than the threshold Th. Accordingly, the present embodiment 2 offers not only the same advantages as the foregoing embodiment 1, but also an advantage of being able to achieve higher detection accuracy than the foregoing embodiment 1.

Incidentally, although the present embodiment 2 describes an example of N=3, when N>3, a configuration is possible in which (N−2) signal processing circuits each comprising the time constant circuit 21, threshold processing circuit 22 and logic unit 23 connected in series (the output signal of the logic unit 23 in a pre-stage signal processing circuit is supplied to the time constant circuit 21 and threshold processing circuit 22 in the following post-stage signal processing circuit), and the time constant Tc' of the time constant circuit 21 in the post-stage signal processing circuit is set at a value higher than the time constant Tc set in the time constant circuit 21 in the pre-stage signal processing circuit (Tc'>Tc).

Embodiment 3

Figure 5:
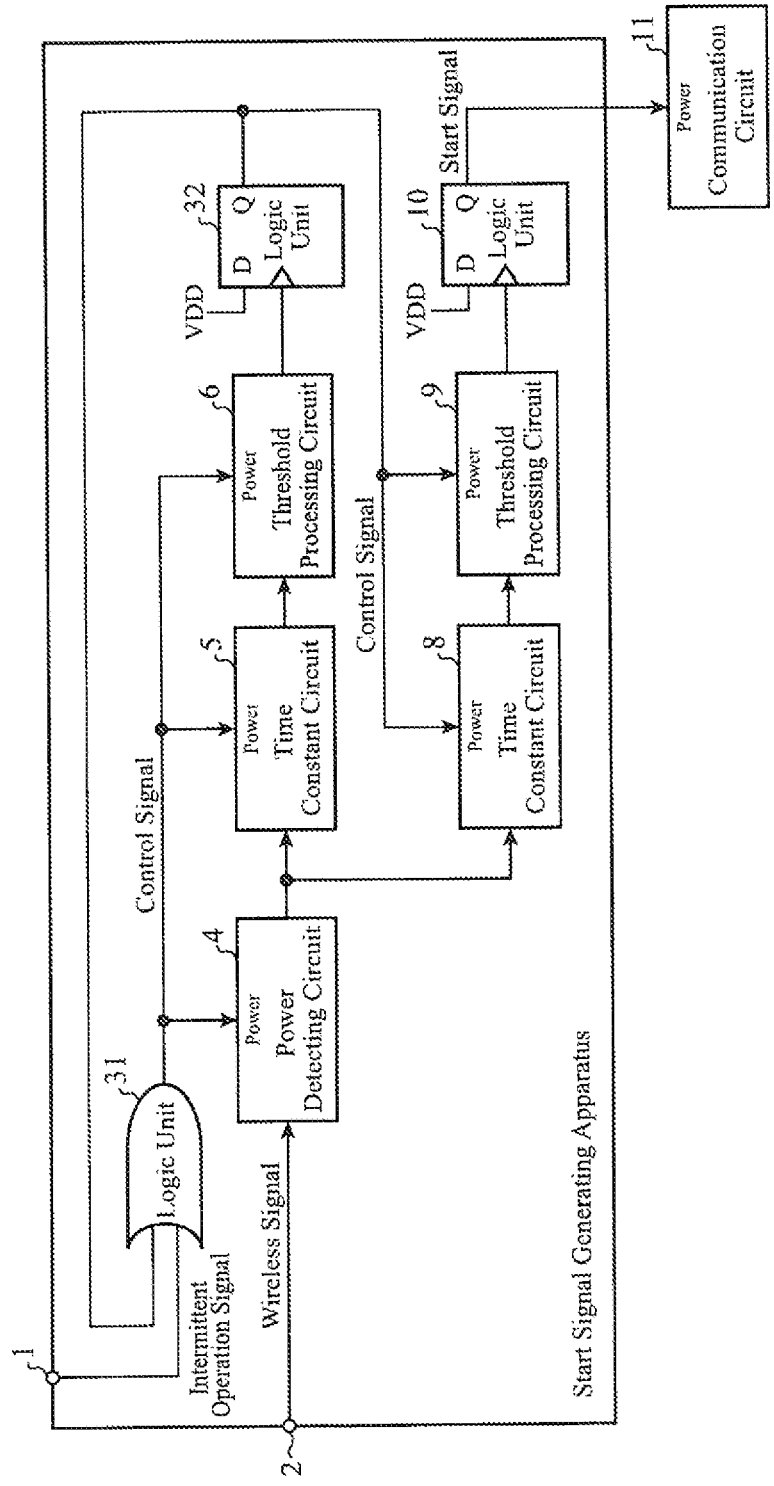
FIG. 5 is a block diagram showing a configuration of a start signal generating apparatus of an embodiment 3 in accordance with the present invention.
Figure 6:
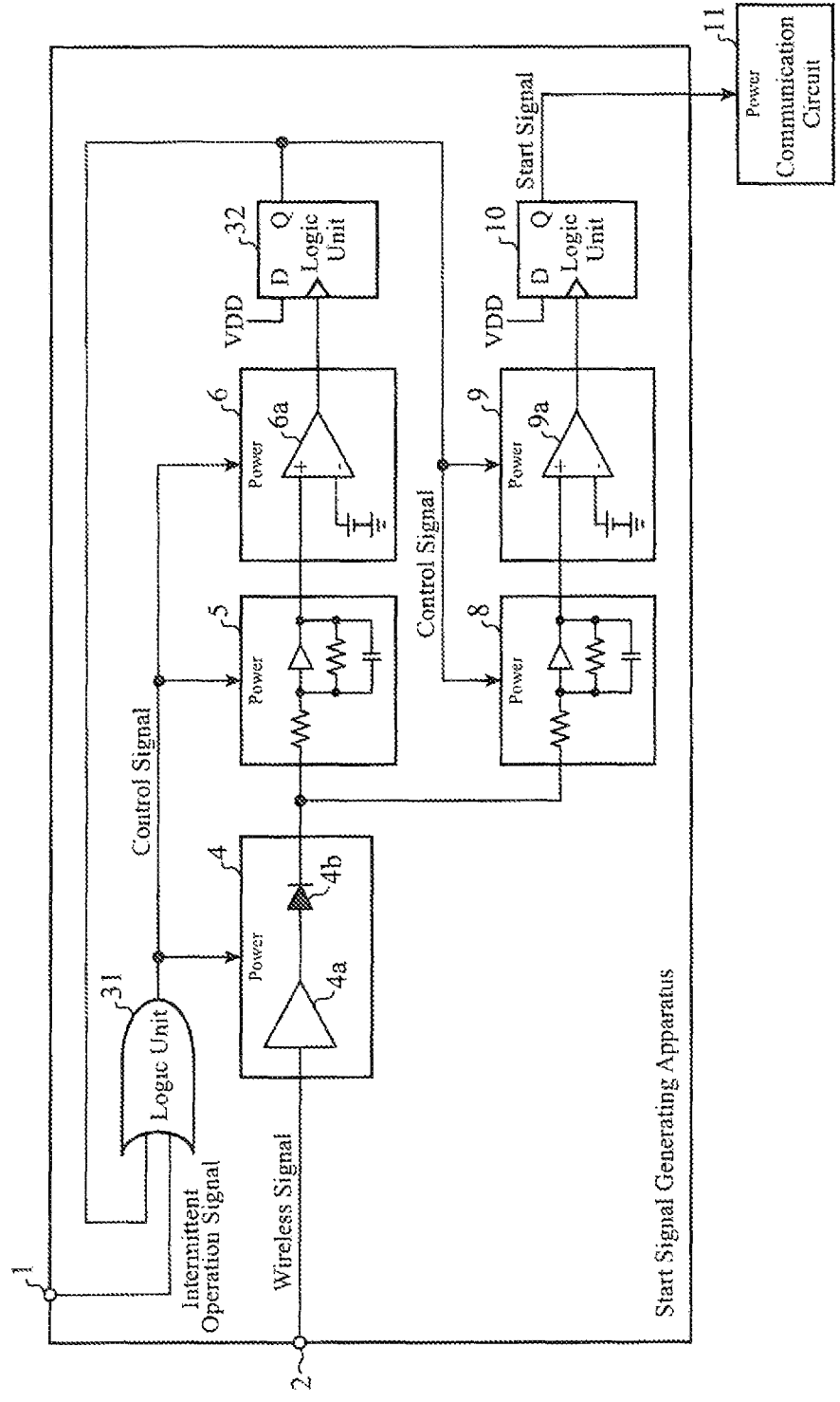
FIG. 6 is a circuit diagram showing an internal configuration of each circuit in the start signal generating apparatus of FIG. 5.

FIG. 5 is a block diagram showing a configuration of a start signal generating apparatus of an embodiment 3 in accordance with the present invention; and FIG. 6 is a circuit diagram showing an internal configuration of each circuit of the start signal generating apparatus of FIG. 5.

In FIG. 5 and FIG. 6, since the same reference numerals as those of FIG. 1 and FIG. 2 designate the same or like components, their description will be omitted.

A logic unit 31, which is composed of an OR circuit, for example, supplies the control signal that instructs starting to the power detecting circuit 4, time constant circuit 5 and threshold processing circuit 6, when the signal level of the intermittent operation signal input through the signal input terminal 1 is H level or when the signal level of the output signal of a logic unit 32 is H level.

The logic unit 32, which is comprised of a flip-flop, for example, supplies the H level signal to the logic unit 31, time constant circuit 8 and threshold processing circuit 9 for the fixed time period (or for the time period until the reset signal is input from outside) when the threshold processing circuit 6 decides that the level of the wireless signal is higher than the threshold Th.

Incidentally, the logic units 31 and 32 constitute an intermittent operation control circuit.

Next, the operation will be described.

Figure 7:
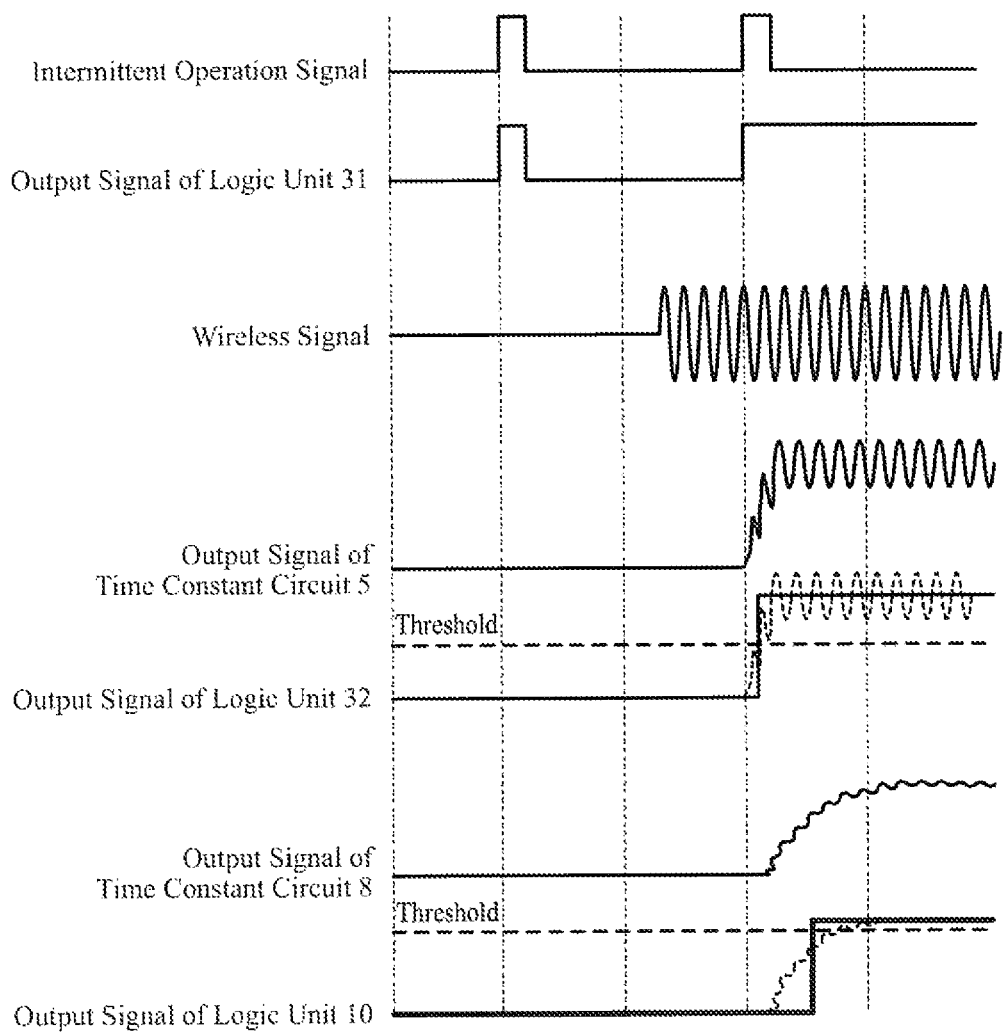
FIG. 7 is a timing chart showing the operation timing of the start signal generating apparatus of FIG. 5.

FIG. 7 is a timing chart showing the operation timing of the start signal generating apparatus of FIG. 5. Referring to the timing chart of FIG. 7, the operation of the start signal generating apparatus of FIG. 5 will now be described.

When the signal level of the intermittent operation signal input through the signal input terminal 1 changes from L level to H level, the logic unit 31 supplies the control signal that instructs starting to the power detecting circuit 4, time constant circuit 5 and threshold processing circuit 6.

At the beginning of the processing, although the signal level of the output signal of the logic unit 32 is L level, the logic unit 31 supplies the power detecting circuit 4, time constant circuit 5 and threshold processing circuit 6 with the control signal that instructs starting when the signal level of the output signal of the logic unit 32 becomes H level, as well.

Although the power detecting circuit 4 is placed in the suspend mode unless the logic unit 31 outputs the control signal that instructs starting, when it receives the control signal that instructs starting from the logic unit 31, it starts the detection processing of the wireless signal input through the signal input terminal 2.

As for the time constant circuit 5, although it is placed in the suspend mode just as the power detecting circuit 4 unless the logic unit 31 outputs the control signal that instructs starting, when it receives the control signal that instructs starting from the logic unit 31, it starts its processing.

More specifically, when receiving the control signal that instructs starting from the logic unit 31, the time constant circuit 5 imposes a frequency limit on the wireless signal detected by the power detecting circuit 4 at the preset time constant Ta as shown in FIG. 7, and supplies the frequency-limited wireless signal to the threshold processing circuit 6.

Here, since the preset time constant Ta is such a small value that will raise the output signal of the time constant circuit 5 sharply enough within the time period while the signal level of the intermittent operation signal is H level, it can increase the response speed. In addition, even if the time length of the H level of the intermittent operation signal is short, the time constant circuit 5 can impose a frequency limit on the wireless signal detected by the power detecting circuit 4. Accordingly, unlike the conventional configuration, since it does not have to maintain the signal level of the intermittent operation signal at H level for a long time, it can reduce the power consumption of the power detecting circuit 4 and the like.

As for the threshold processing circuit 6, although it is placed in the suspend mode just as the power detecting circuit 4 unless the logic unit 31 outputs the control signal that instructs starting, when it receives the control signal that instructs starting from the logic unit 31, it starts its processing.

More specifically, when receiving the control signal that instructs starting from the logic unit 31, the threshold processing circuit 6 compares the level of the wireless signal on which the frequency limit is imposed by the time constant circuit 5 with the threshold Th, and decides on whether the level of the wireless signal is higher than the threshold Th or not.

When the threshold processing circuit 6 decides that the level of the wireless signal is higher than the threshold Th, the logic unit 32 supplies the H level signal to the logic unit 31, time constant circuit 8 and threshold processing circuit 9 for a fixed time period (or a time period until the reset signal is input from outside) as shown in FIG. 7. The fixed time period is sufficiently long as compared with the frequency of the wireless signal.

Although the time constant circuit 8 is placed in the suspend mode just as the power detecting circuit 4 unless the logic unit 32 outputs the H level signal (the control signal that instructs starting), when it receives the H level signal from the logic unit 32, it starts its processing.

More specifically, when receiving the H level signal from the logic unit 32, the time constant circuit 8 imposes a frequency limit on the wireless signal detected by the power detecting circuit 4 at the preset time constant Tb as shown in FIG. 7, and supplies the frequency-limited wireless signal to the threshold processing circuit 9.

Incidentally, although the time constant circuit 8 of FIG. 1 starts its processing when the signal level of the intermittent operation signal input through the signal input terminal 1 changes from L level to H level and the logic unit 3 outputs the control signal that instructs starting, the time constant circuit 8 of FIG. 5 is not supplied with the control signal that instructs starting even if the signal level of the intermittent operation signal input through the signal input terminal 1 changes from L level to H level, and keeps the suspend mode until the logic unit 32 outputs the H level signal. Accordingly, the time constant circuit 8 of FIG. 5 can reduce the power consumption as compared with the time constant circuit 8 of FIG. 1.

Here, since the preset time constant Tb is set at a sufficiently large value compared with the frequency of the wireless signal, the time constant circuit 8 has a slow response time and cannot rise sufficiently within the time in which the signal level of the intermittent operation signal is H level.

However, when the threshold processing circuit 6 decides that the level of the wireless signal is higher than the threshold Th, since the logic unit 32 continues to output the H level signal (the control signal that instructs starting) for a sufficiently long time as compared with the frequency of the wireless signal, even if it has the slow response time, it can rise sufficiently.

Thus, since the large time constant Tb is set in the time constant circuit 8, it has the slow response time. However, since the fluctuations of the value after convergence becomes smaller, it can improve the detection accuracy of the wireless signal.

As for the threshold processing circuit 9 as well, although it is placed in the suspend mode just as the power detecting circuit 4 unless it receives the H level signal (the control signal that instructs starting) from the logic unit 32, it starts its processing when it receives the H level signal from the logic unit 32.

More specifically, when the threshold processing circuit 9 receives the H level signal from the logic unit 32, it compares the level of the wireless signal on which the frequency limit is imposed by the time constant circuit 8 with the threshold Th, and decides on which the level of the wireless signal is higher than the threshold Th or not.

Incidentally, although the threshold processing circuit 9 of FIG. 1 starts its processing when the signal level of the intermittent operation signal input through the signal input terminal 1 changes from L level to H level and the logic unit 3 outputs the control signal that instructs starting, the threshold processing circuit 9 of FIG. 5 maintains the suspend mode until the logic unit 32 outputs the H level signal because it is not supplied with the control signal that instructs starting even if the signal level of the intermittent operation signal input through the signal input terminal 1 changes from L level to H level. Accordingly, the threshold processing circuit 9 of FIG. 5 can reduce the power consumption as compared with the threshold processing circuit 9 of FIG. 1.

When the threshold processing circuit 9 decides that the level of the wireless signal is higher than the threshold Th, the logic unit 10 supplies the start signal (H level signal) to the communication circuit 11 for the fixed time period (or for the time period until the reset signal is input from outside).

This will activate the communication circuit 11.

As is clear from the above, according to the present embodiment 3, it is configured in such a manner that it comprises, in addition to the time constant circuit 5 which imposes a frequency limit on the wireless signal detected by the power detecting circuit 4 at the preset time constant Ta, the time constant circuit 8 which imposes a frequency limit on the wireless signal detected by the power detecting circuit 4 at the time constant Tb greater than the time constant Ta set in the time constant circuit 5, that the logic unit 31 supplies the control signal that instructs starting to the power detecting circuit 4, time constant circuit 5 and threshold processing circuit 6 when the signal level of the intermittent operation signal input through the signal input terminal 1 is H level or when the threshold processing circuit 6 decides that the level of the wireless signal is higher than the threshold Th, and that the logic unit 32 supplies the control signal that instructs starting to the time constant circuit 8 and threshold processing circuit 9 when the threshold processing circuit 6 decides that the level of the wireless signal is higher than the threshold Th. Accordingly, it offers an advantage of being able to realize reducing the power consumption without bringing about the reduction of the response speed or the deterioration of the detection accuracy.

More specifically, in the ordinary intermittent operation, it becomes possible for the time constant circuit 5 which has the small time constant Ta and is capable of achieving the high-speed response to carry out the rough detection of the wireless signal, thereby being able to reduce the time period during which the signal level of the intermittent operation signal is H level. In addition, when the wireless signal is present, the time constant circuit 8 with the large time constant Tb can detect the wireless signal at high accuracy, thereby being able to start the communication circuit 11.

In addition, even if the signal level of the intermittent operation signal input through the signal input terminal 1 changes from L level to H level, the control signal that instructs starting is not supplied to the time constant circuit 8 and threshold processing circuit 9 so that the time constant circuit 8 and threshold processing circuit 9 maintain the suspend mode until the logic unit 32 outputs the H level signal. This enables further reducing the power consumption as compared with the embodiment 1.

Embodiment 4

Although the foregoing embodiment 3 shows an example that comprises two time constant circuits and two threshold processing circuits, a configuration is also possible which comprises N time constant circuits and N threshold processing circuits (N is an integer not less than three).

The present embodiment 4 shows an example where N=3.

Figure 8:
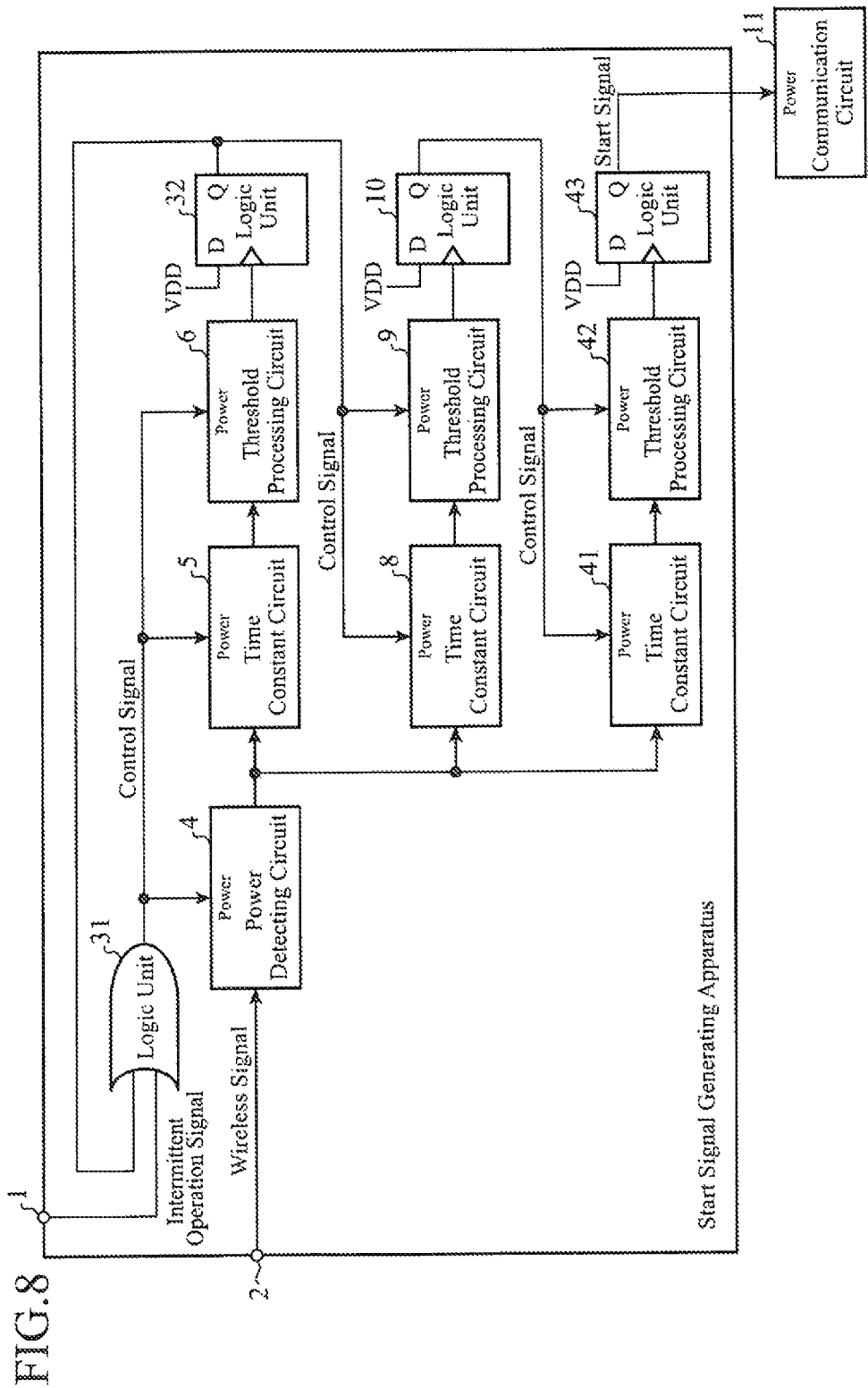
FIG. 8 is a block diagram showing a configuration of a start signal generating apparatus of an embodiment 4 in accordance with the present invention.

FIG. 8 is a block diagram showing a configuration of a start signal generating apparatus of an embodiment 4 in accordance with the present invention. In FIG. 8, since the same reference numerals as those of FIG. 5 designate the same or like components, their description will be omitted.

A time constant circuit 41, which constitutes a third time constant circuit and is comprised of an active filter or the like, for example, is placed in the suspend mode when the signal level of the output signal of the logic unit 10 is L level, but starts its processing when the signal level of the output signal of the logic unit 10 becomes H level.

More specifically, the time constant circuit 41 is a circuit that imposes, when the signal level of the output signal of the logic unit 10 becomes H level, a frequency limit on the wireless signal detected by the power detecting circuit 4 at a time constant Tc greater than the time constant Tb set in the time constant circuit 8 (Tb<Tc).

A threshold processing circuit 42, which is comprised of a comparator or the like, for example, stays in the suspend mode when the signal level of the output signal of the logic unit 10 is L level, but starts its processing when the signal level of the output signal of the logic unit 10 becomes H level.

More specifically, the threshold processing circuit 42 is a third level decision circuit that compares, when the signal level of the output signal of the logic unit 10 becomes H level, the level of the wireless signal on which the frequency limit is imposed by the time constant circuit 41 with the threshold Th, and decides on whether the level of the wireless signal is higher than the threshold Th or not.

A logic unit 43, which is comprised of a flip-flop, for example, is a start signal output circuit that supplies, when the threshold processing circuit 42 decides that the level of the wireless signal is higher than the threshold Th, a start signal to the communication circuit 11 for a fixed time period (or a time period until a reset signal is input from outside).

Next, the operation will be described.

Since the present embodiment 4 is the same as the foregoing embodiment 3 except that it comprises the time constant circuit 41, threshold processing circuit 42 and logic unit 43, the processing contents of the time constant circuit 41, threshold processing circuit 42 and logic unit 43 will now be described.

In the present embodiment 4, however, the output signal of the logic unit 10 is supplied not to the communication circuit 11, but to the time constant circuit 41 and threshold processing circuit 42.

Unless the time constant circuit 41 receives the H level output signal from the logic unit 10, although it is placed in the suspend mode just as the power detecting circuit 4, if it receives the H level output signal from the logic unit 10, it starts its processing.

More specifically, when the time constant circuit 41 receives the H level output signal from the logic unit 10, it imposes a frequency limit on the wireless signal detected by the power detecting circuit 4 at the preset time constant Tc, and supplies the frequency-limited wireless signal to the threshold processing circuit 42.

Here, the preset time constant Tc is still greater than the time constant Tb set in the time constant circuit 8. Accordingly, the time constant circuit 41 has smaller fluctuations in the value after convergence than the time constant circuit 8, thereby being able to improve the detection accuracy of the wireless signal.

As for the threshold processing circuit 42, unless it receives the H level output signal from the logic unit 10, although it is placed in the suspend mode just as the power detecting circuit 4, it starts its processing when it receives the H level output signal from the logic unit 10.

More specifically, when the threshold processing circuit 42 receives the H level output signal from the logic unit 10, it compares the level of the wireless signal on which the frequency limit is imposed by the time constant circuit 41 with the threshold Th, and decides on whether the level of the wireless signal is higher than the threshold Th or not.

If the threshold processing circuit 42 decides that the level of the wireless signal is higher than the threshold Th, the logic unit 43 supplies the start signal (H level signal) to the communication circuit 11 for the fixed time period (or for the time period until the reset signal is input from outside).

This will activate the communication circuit 11.

As is clear from the above, according to the present embodiment 4, it is configured in such a manner that it comprises the time constant circuit 41 which imposes, when the signal level of the output signal of the logic unit 10 becomes H level, the frequency limit on the wireless signal detected by the power detecting circuit 4 at the time constant Tc greater than the time constant Tb set in the time constant circuit 8 (Tb<Tc); and the threshold processing circuit 42 which compares, when the signal level of the output signal of the logic unit 10 becomes H level, the level of the wireless signal on which the frequency limit is imposed by the time constant circuit 41 with the threshold Th, and decides on whether the level of the wireless signal is higher than the threshold Th or not, and that the logic unit 43 supplies the start signal to the communication circuit 11 when the threshold processing circuit 42 decides that the level of the wireless signal is higher than the threshold Th. Accordingly, the present embodiment 4 offers not only the same advantages as the foregoing embodiment 3, but also an advantage of being able to achieve higher detection accuracy than the foregoing embodiment 3.

Incidentally, although the present embodiment 4 describes an example of N=3, when N>3, a configuration is possible in which (N−2) signal processing circuits each comprising the time constant circuit 41, threshold processing circuit 42 and logic unit 43 connected in series (the output signal of the logic unit 43 in a pre-stage signal processing circuit is supplied to the time constant circuit 41 and threshold processing circuit 42 in the next post-stage signal processing circuit), and the time constant Tc' of the time constant circuit 41 in the post-stage signal processing circuit is set at a value greater than the time constant Tc set in the time constant circuit 41 in the pre-stage signal processing circuit (Tc'>Tc).

Embodiment 5

Figure 9:
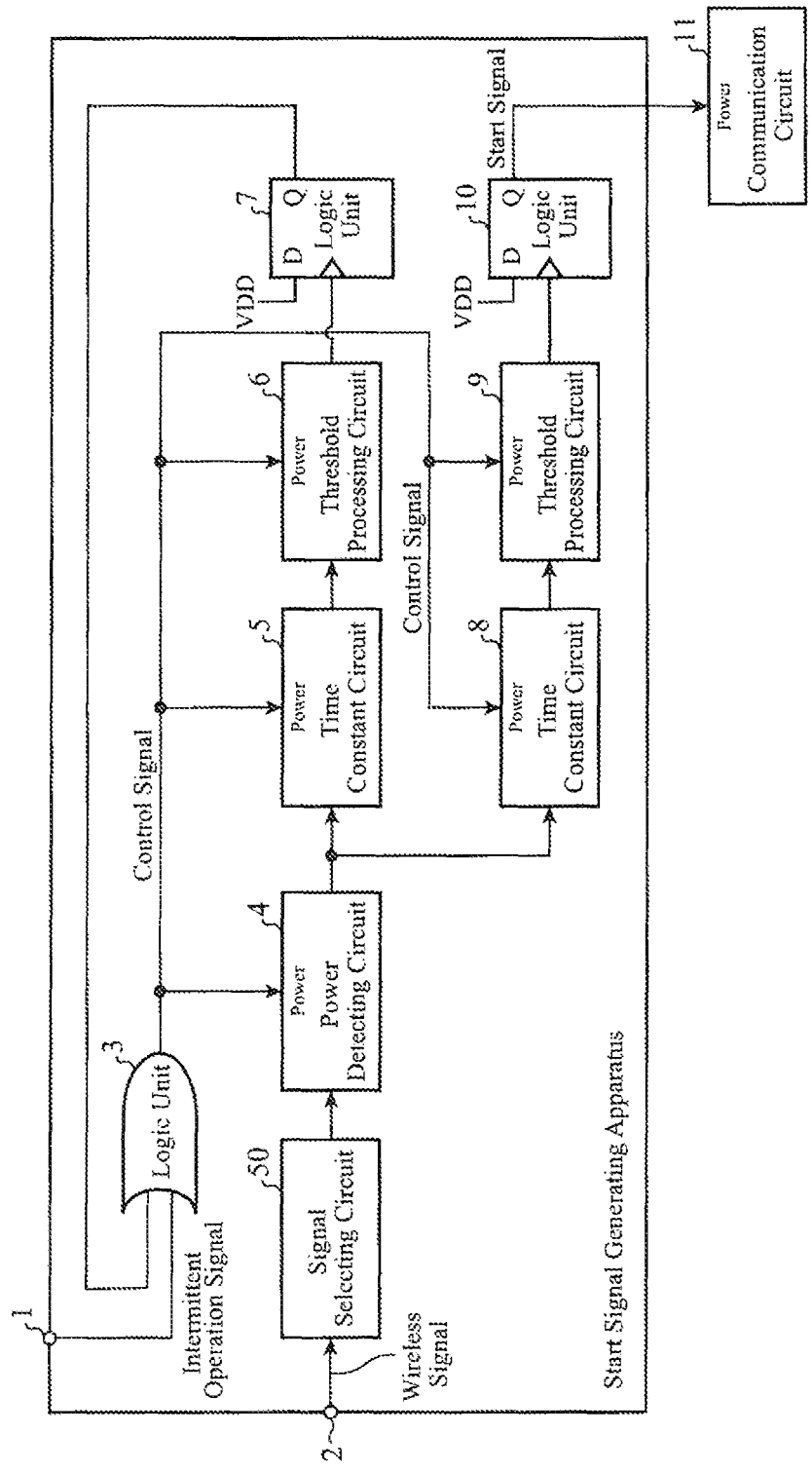
FIG. 9 is a block diagram showing a configuration of a start signal generating apparatus of an embodiment 5 in accordance with the present invention.
Figure 10:
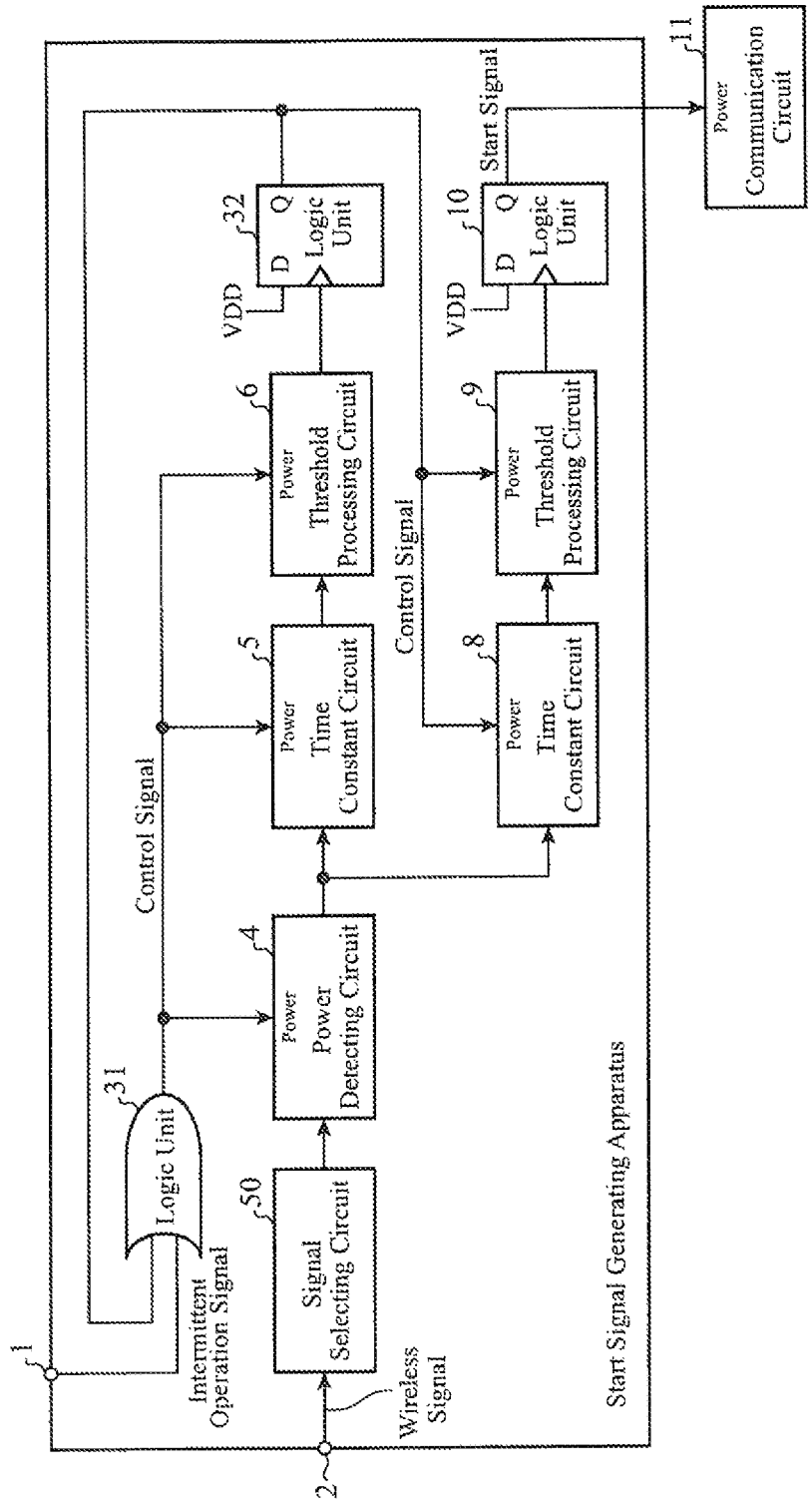
FIG. 10 is a block diagram showing a configuration of a start signal generating apparatus of an embodiment 5 in accordance with the present invention.

Although the foregoing embodiments 1-4 show an example in which the wireless signal input through the signal input terminal 2 is supplied to the power detecting circuit 4, a configuration as shown in FIG. 9 and FIG. 10 is also possible which comprises a signal selection circuit 50 that extracts a wireless signal with a prescribed frequency from the wireless signal input through the signal input terminal 2, and supplies the power detecting circuit 4 only with the wireless signal with the prescribed frequency.

The signal selection circuit 50 can be comprised of an active filter or a passive filter. Incorporating the signal selection circuit 50 enables detecting the wireless signal of a wireless LAN to carry out processing such as starting the communication circuit 11.

Embodiment 6

Figure 11:
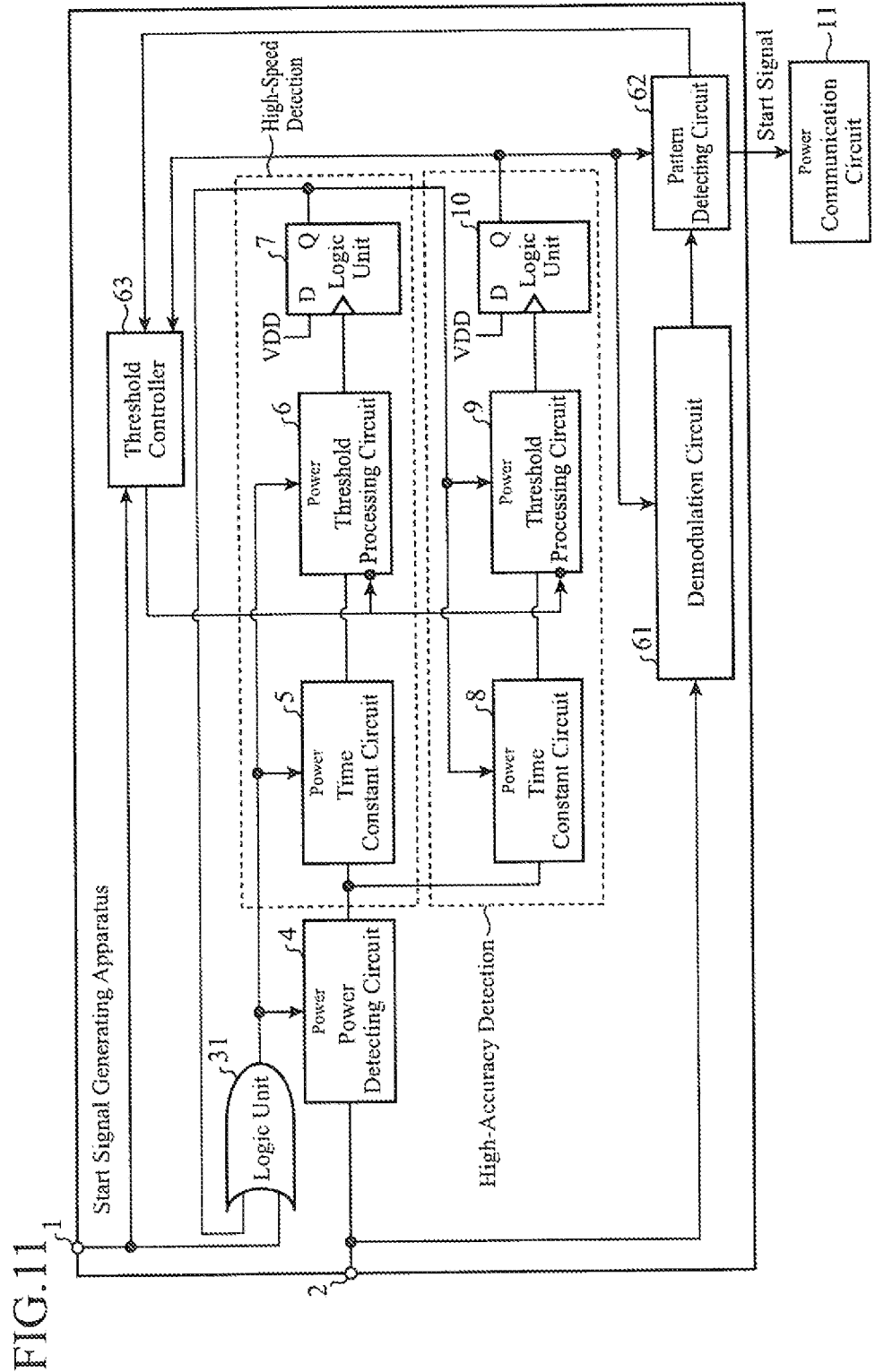
FIG. 11 is a block diagram showing a configuration of a start signal generating apparatus of an embodiment 6 in accordance with the present invention.

FIG. 11 is a block diagram showing a configuration of a start signal generating apparatus of an embodiment 6 in accordance with the present invention. In FIG. 11, since the same reference numerals as those of FIG. 5 designate the same or like components, their description will be omitted.

A demodulation circuit 61 is activated by the start signal output from the logic unit 10 when the threshold processing circuit 9 decides that the level of the wireless signal is higher than the threshold Th, starts the demodulation processing of the wireless signal input through the signal input terminal 2, and executes the processing of outputting a signal pattern contained in the wireless signal.

A pattern detecting circuit 62 is activated by the start signal output from the logic unit 10 when the threshold processing circuit 9 decides that the level of the wireless signal is higher than the threshold Th, decides on whether the signal pattern output from the demodulation circuit 61 matches a prescribed pattern or not, and if it matches the prescribed pattern, it executes the processing of supplying a start signal to the external communication circuit 11.

Incidentally, the demodulation circuit 61 and pattern detecting circuit 62 constitute a start signal output circuit.

A threshold control circuit 63 executes the processing of controlling the threshold Th with which the threshold processing circuits 6 and 9 compare the level of the wireless signal in accordance with the decision result of the pattern detecting circuit 62.

More specifically, when the threshold control circuit 63 receives the decision result that the signal pattern does not match the prescribed pattern from the pattern detecting circuit 62, it considers that a false start occurs, counts the number of times of the false starts, and if the count value exceeds a preset number of times N, it increases the absolute value of the threshold Th in the threshold processing circuits 6 and 9 to reduce the sensitivity of the threshold processing circuits 6 and 9 (such as reducing the sensitivity by 1 dB) (for example, if the wireless signal detected by the power detecting circuit 4 is positive, the threshold control circuit 63 increases the threshold Th of the threshold processing circuits 6 and 9, but if the wireless signal detected by the power detecting circuit 4 is negative, it reduces the threshold Th of the threshold processing circuits 6 and 9). On the other hand, if it receives the decision result that the signal pattern matches the prescribed pattern from the pattern detecting circuit 62, it resets its count value.

In addition, the threshold control circuit 63 counts, as the number of times of non-starts, the number of times the signal level of the intermittent operation signal input through the signal input terminal 1 changes from L level to H level until it receives the start signal (H level signal) from the logic unit 10 during the period in which the sensitivity of the threshold processing circuits 6 and 9 is reduced, and if the count value of the number of times of the non-starts exceeds a preset number of times K, the threshold control circuit 63 executes the processing of reducing the absolute value of the threshold Th in the threshold processing circuits 6 and 9 to increase the sensitivity of the threshold processing circuits 6 and 9 (for example, increase the sensitivity by 1 dB), (for example, if the wireless signal detected by the power detecting circuit 4 is positive, it reduces the threshold Th of the threshold processing circuits 6 and 9, and if the wireless signal detected by the power detecting circuit 4 is negative, it increases the threshold Th of the threshold processing circuits 6 and 9).

Next, the operation will be described.

Figure 12:
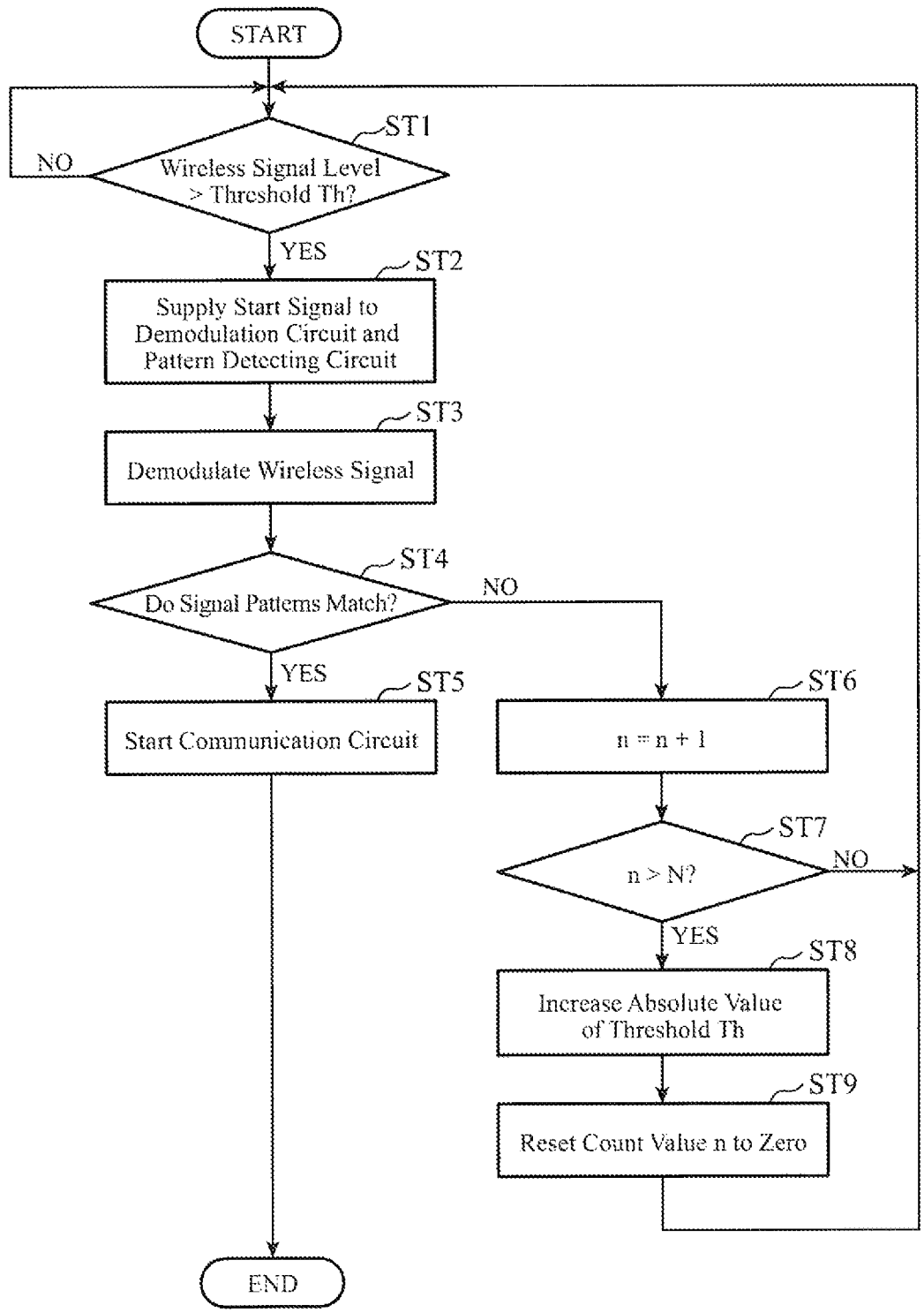
FIG. 12 is a flowchart showing processing contents of the start signal generating apparatus of the embodiment 6 in accordance with the present invention.

FIG. 12 is a flowchart showing the processing contents of the start signal generating apparatus of the embodiment 6 in accordance with the present invention.

Figure 13:
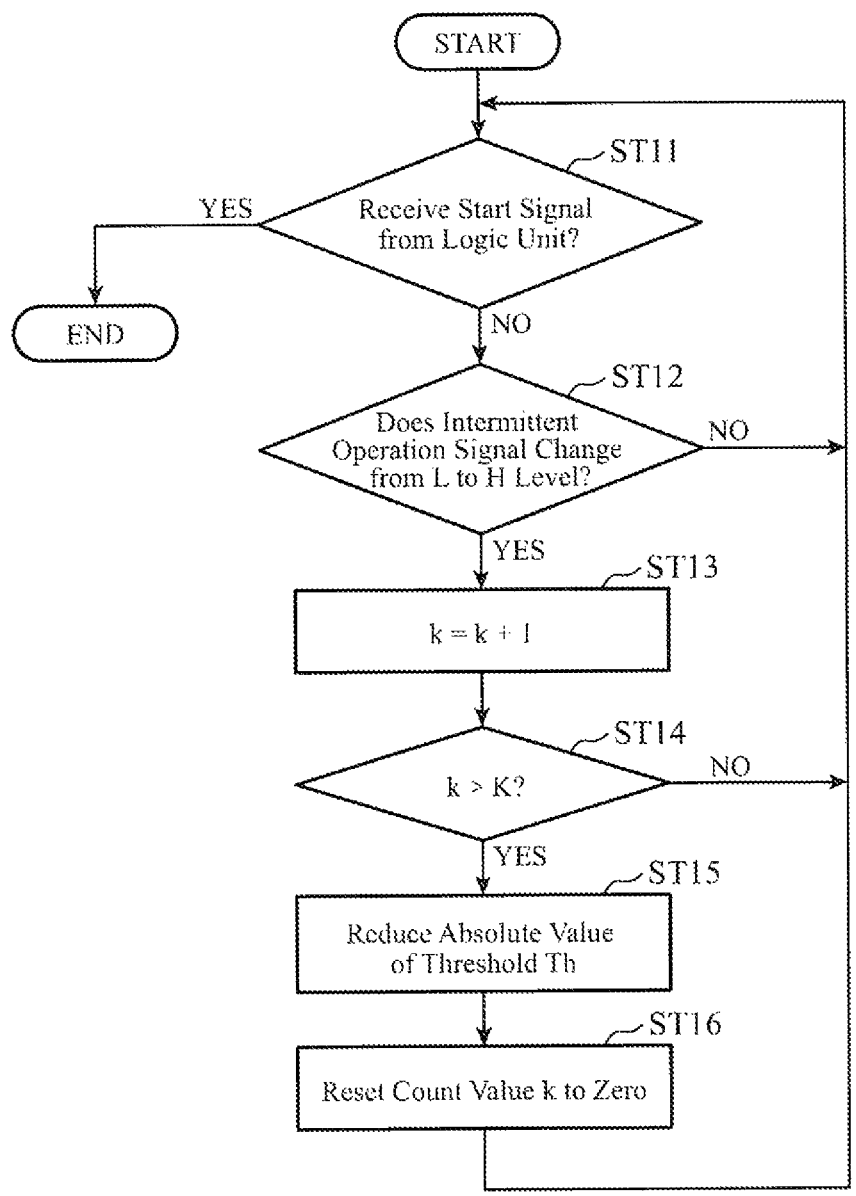
FIG. 13 is a flowchart showing processing contents of a threshold control circuit during a period of reducing the sensitivity of the threshold processing circuit.
Figure 14:
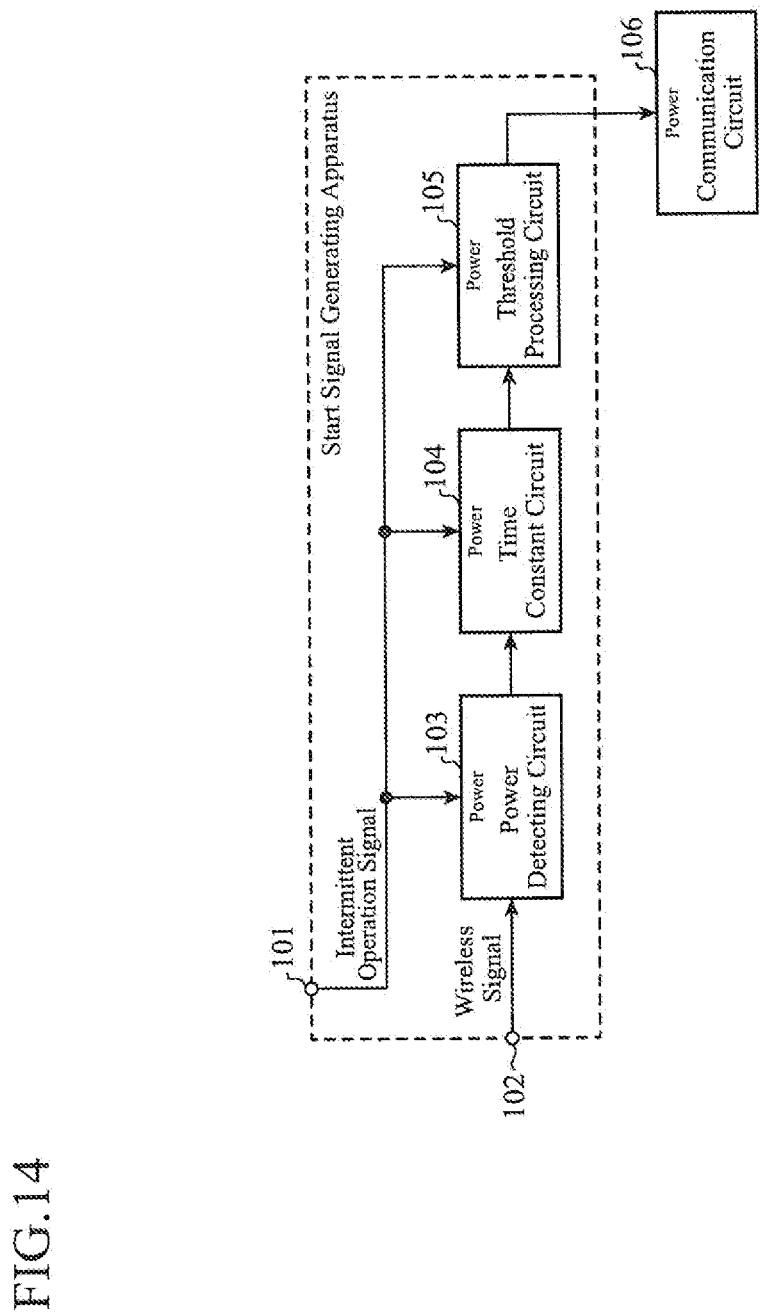
FIG. 14 is a block diagram showing a configuration of a conventional start signal generating apparatus.
Figure 15:
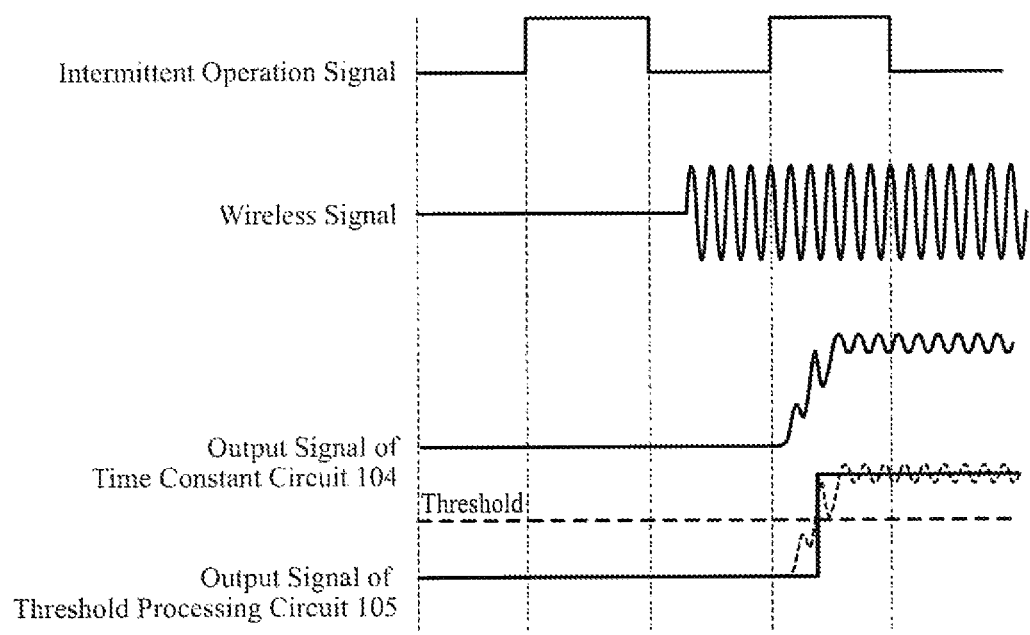
FIG. 15 is a timing chart showing operation timing of the start signal generating apparatus of FIG. 14.

In addition, FIG. 13 is a flowchart showing the processing contents of the threshold control circuit 63 during the period when the sensitivity of the threshold processing circuits 6 and 9 is reduced.

Since the operation is the same as those of the foregoing embodiments 1-5 except that the present embodiment 6 comprises the demodulation circuit 61, pattern detecting circuit 62 and threshold control circuit 63, the processing contents of the demodulation circuit 61, pattern detecting circuit 62 and threshold control circuit 63 will be mainly described here.

Although the present embodiment 6 describes an example in which the demodulation circuit 61, pattern detecting circuit 62 and threshold control circuit 63 are applied to the start signal generating apparatus of FIG. 5, it goes without saying that they can also be applied to the start signal generating apparatus of FIG. 1, FIG. 4, or FIG. 8-FIG. 10.

Although the threshold processing circuit 9 stays in the suspend mode just as the power detecting circuit 4 unless the control signal that instructs starting is output from the logic unit 7, if it receives the control signal that instructs starting from the logic unit 7, it starts its processing (the threshold processing circuit 9 executes the intermittent operation).

More specifically, when the threshold processing circuit 9 receives the control signal that instructs starting from the logic unit 7, it compares the level of the wireless signal on which the frequency limit is imposed by the time constant circuit 8 with the threshold Th as in the embodiments 1-5, and decides on whether the level of the wireless signal is higher than the threshold Th or not (step ST1 of FIG. 12).

If the threshold processing circuit 9 decides that the level of the wireless signal is higher than the threshold Th, the logic unit 10 supplies the start signal (H level signal) to the demodulation circuit 61 and pattern detecting circuit 62 for the fixed time period (or for the time period until the reset signal is input from outside) (step ST2).

Although the demodulation circuit 61 stays in the suspend mode unless the logic unit 10 outputs the start signal, it starts the demodulation processing of the wireless signal input through the signal input terminal 2 when the logic unit 10 outputs the start signal, and supplies the signal pattern contained in the wireless signal to the pattern detecting circuit 62 (step ST3).

Although the pattern detecting circuit 62 stays in the suspend mode just as the demodulation circuit 61 unless the logic unit 10 outputs the start signal, if the logic unit 10 outputs the start signal, it starts its processing of deciding on whether the signal pattern output from the demodulation circuit 61 matches the prescribed pattern (step ST4).

If the signal pattern output from the demodulation circuit 61 matches the prescribed pattern, the pattern detecting circuit 62 supplies the start signal to the external communication circuit 11 (step ST5).

This will activate the communication circuit 11.

The threshold control circuit 63 executes the processing of receiving the decision result of the pattern detecting circuit 62, and of controlling the threshold Th with which the threshold processing circuits 6 and 9 compare the level of the wireless signal in accordance with the decision result.

The processing contents of the threshold control circuit 63 will now be described concretely.

The threshold control circuit 63 comprises a counter A for counting the number of times of the false starts (the number of times the logic unit 10 outputs the start signal falsely), and a counter B for counting the number of times of the non-starts (the number of times of not being started even though the wireless signal containing the desired signal pattern is input), and it is assumed that the count values n and k of the counters A and B are "0" in the initial state.

If the threshold control circuit 63 receives from the pattern detecting circuit 62 the decision result indicating that the signal pattern does not match the prescribed pattern, it considers that a false start occurs, and increments the count value n of the counter A by one (step ST6).

The threshold control circuit 63 compares the count value n of the counter A with the preset number of times N, and if the count value n of the counter A exceeds the number of times N (step ST7), it increases the absolute value of the threshold Th in the threshold processing circuits 6 and 9 so as to reduce the possibility that the logic unit 10 outputs the start signal falsely by reducing the sensitivity of the threshold processing circuits 6 and 9 (step ST8).

As for the sensitivity of the threshold processing circuits 6 and 9, although it is assumed to be reduced by 1 dB, it is not limited to 1 dB.

Incidentally, if the signal level of the wireless signal detected by the power detecting circuit 4 is positive, the threshold control circuit 63 increases the threshold Th of the threshold processing circuits 6 and 9, thereby reducing the sensitivity of the threshold processing circuits 6 and 9. On the other hand, if the signal level of the wireless signal detected by the power detecting circuit 4 is negative, the threshold control circuit 63 reduces the threshold Th of the threshold processing circuits 6 and 9, thereby reducing the sensitivity of the threshold processing circuits 6 and 9.

As described above, if the threshold control circuit 63 reduces the sensitivity of the threshold processing circuits 6 and 9, it resets the count value n of the counter A to zero (step ST9), and then returns to the processing of step ST1 to repeat the processing at steps ST1-ST9. However, if the count value n of the counter A exceeds the number of times N, again, the threshold control circuit 63 operates in such a manner as to further reduce the sensitivity of the threshold processing circuits 6 and 9.

On the other hand, if the threshold control circuit 63 receives the decision result indicating that the signal pattern matches the prescribed pattern from the pattern detecting circuit 62 after reducing the sensitivity of the threshold processing circuits 6 and 9, it resets the count value n of the counter A to zero, and the pattern detecting circuit 62 supplies the start signal to the communication circuit 11 (step ST5).

Incidentally, unless the count value n of the counter A exceeds the number of times N (step ST7), the threshold control circuit 63 returns to the processing at step ST1 without reducing the sensitivity of the threshold processing circuits 6 and 9, and repeats the processing at steps ST1-ST9.

Through reducing the sensitivity of the threshold processing circuits 6 and 9, the threshold control circuit 63 reduces the possibility that the logic unit 10 outputs the start signal even though noise is supplied to the power detecting circuit 4.

Since the processing of reducing the sensitivity of the threshold processing circuits 6 and 9 is carried out repeatedly until the logic unit 10 stops outputting the start signal even if the noise is supplied to the power detecting circuit 4, a false start due to noise is suppressed.

However, if the absolute value of the threshold Th of the threshold processing circuits 6 and 9 is increased more than necessary, and the sensitivity of the threshold processing circuits 6 and 9 is reduced too much, there is a possibility that the logic unit 10 does not output the start signal even if the wireless signal containing the desired signal pattern is supplied to the power detecting circuit 4.

Thus, after the threshold control circuit 63 reduces the sensitivity of the threshold processing circuits 6 and 9, it counts, as the number of times of the non-starts, the number of times the signal level of the intermittent operation signal input through the signal input terminal 1 changes from L level to H level until it receives the start signal (H level signal) from the logic unit 10.

More specifically, if the threshold control circuit 63 has already reduced the sensitivity of the threshold processing circuits 6 and 9, and if it has not yet received the start signal (H level signal) from the logic unit 10 (step ST11 of FIG. 13), it increments the count value k of the counter B by one (step ST13) every time the signal level of the intermittent operation signal changes from L level to H level (step ST12).

When the wireless signal including the desired signal pattern is supplied to the power detecting circuit 4, and when the signal level of the intermittent operation signal input through the signal input terminal 1 changes from L level to H level as shown in FIG. 3, if the threshold Th of the threshold processing circuits 6 and 9 is appropriate, the logic unit 10 outputs the start signal (H level signal) after the time period corresponding to the time constant Tb of the time constant circuit 8. However, if the absolute value of the threshold Th of the threshold processing circuits 6 and 9 is too large, the logic unit 10 does not output the start signal (H level signal).

Accordingly, even if the signal level of the intermittent operation signal input through the signal input terminal 1 changes from L level to H level after the reduction of the sensitivity of the threshold processing circuits 6 and 9, if the logic unit 10 does not output the start signal (H level signal), it is conceivable that a non-start occurs. Thus, the threshold control circuit 63 counts the number of times the signal level of the intermittent operation signal changes from L level to H level until it receives the start signal (H level signal) from the logic unit 10 as the number of times of the non-starts.

The threshold control circuit 63 compares the count value k of the counter B with the preset number of times K, and if the count value k of the counter B exceeds the number of times K (step ST14), it reduces the absolute value of the threshold Th in the threshold processing circuits 6 and 9 to increase the sensitivity of the threshold processing circuits 6 and 9 and to suppress the occurrence of the non-start (step ST15).

As for the sensitivity of the threshold processing circuits 6 and 9, although it is assumed to be increased by 1 dB, for example, it is not limited to 1 dB.

Incidentally, if the signal level of the wireless signal detected by the power detecting circuit 4 is positive, the threshold control circuit 63 reduces the threshold Th of the threshold processing circuits 6 and 9, thereby increasing the sensitivity of the threshold processing circuits 6 and 9. On the other hand, if the signal level of the wireless signal detected by the power detecting circuit 4 is negative, the threshold control circuit 63 increases the threshold Th of the threshold processing circuits 6 and 9, thereby increasing the sensitivity of the threshold processing circuits 6 and 9.

As described above, if the threshold control circuit 63 increases the sensitivity of the threshold processing circuits 6 and 9, it resets the count value k of the counter B to zero (step ST16), and then returns to the processing of step ST11 to repeat the processing at steps ST11-ST16. However, if the count value k of the counter B exceeds the number of times K, again, the threshold control circuit 63 operates in such a manner as to further increase the sensitivity of the threshold processing circuits 6 and 9.

Incidentally, unless the count value k of the counter B exceeds the number of times K (step ST14), the threshold control circuit 63 returns to the processing at step ST11 without increasing the sensitivity of the threshold processing circuits 6 and 9, and repeats the processing at steps ST11-ST16.

When it receives the start signal (H level signal) from the logic unit 10, it proceeds to step ST1 of FIG. 12.

As is clear from the above, according to the present embodiment 6, it is configured in such a manner that if the threshold processing circuit 9 decides that the level of the wireless signal is higher than the prescribed threshold Th, it decides on whether the pattern contained in the wireless signal matches the prescribed pattern or not, and if the pattern matches the prescribed pattern, it supplies the start signal to the communication circuit 11. Accordingly, it offers an advantage of being able to start the communication circuit 11 so long as the pattern matches the prescribed pattern.

In addition, according to the present embodiment 6, it is configured in such a manner that if the decision result of the pattern detecting circuit 62 indicates that the pattern contained in the wireless signal does not match the prescribed pattern by the prescribed number of times or more, it increases the absolute value of the threshold Th with which the threshold processing circuits 6 and 9 compare the level of the wireless signal. Accordingly, it can suppress the occurrence of the false start due to noise. As a result, it offers an advantage of being able to further reduce the power consumption.

Incidentally, it is to be understood that a free combination of the individual embodiments, variations of any components of the individual embodiments or removal of any components of the individual embodiments is possible within the scope of the present invention.

INDUSTRIAL APPLICABILITY

A start signal generating apparatus in accordance with the present invention starts the post-stage communication circuit or the like only so long as the wireless signal is present. Accordingly, it is suitable for applications requiring reduction of power consumption.

DESCRIPTION OF REFERENCE SYMBOLS

1, 2 signal input terminal; 3 logic unit (intermittent operation control circuit); 4 power detecting circuit (wireless signal detecting circuit); 4a amplifier; 4b diode; 5 time constant circuit (first time constant circuit); 6 threshold processing circuit (first level decision circuit); 6a comparator; 7 logic unit (intermittent operation control circuit); 8 time constant circuit (second time constant circuit); 9 threshold processing circuit (second level decision circuit); 9a comparator; 10 logic unit (start signal output circuit); 11 communication circuit; 21 time constant circuit (third time constant circuit); 22 threshold processing circuit (third level decision circuit); 23 logic unit (start signal output circuit); 31, 32 logic unit (intermittent operation control circuit); 41 time constant circuit (third time constant circuit); 42 threshold processing circuit (third level decision circuit); 43 logic unit (start signal output circuit); 50 signal selection circuit; 61 demodulation circuit (start signal output circuit); 62 pattern detecting circuit (start signal output circuit); 63 threshold control circuit; 101,102 signal input terminal; 103 power detecting circuit; 104 time constant circuit; 105 threshold processing circuit; 106 communication circuit.

What is claimed is:

1. A start signal generating apparatus comprising:
   a wireless signal detecting circuit that executes detection processing of a wireless signal;
   a first time constant circuit that imposes a first frequency limit on the wireless signal detected by the wireless signal detecting circuit at a preset first time constant;
   a first level decision circuit that decides on whether a first level of the wireless signal on which the first frequency limit is imposed by the first time constant circuit is higher than a prescribed first threshold or not;
   a second time constant circuit that imposes a second frequency limit on the wireless signal detected by the wireless signal detecting circuit at a second time constant greater than the first time constant set in the first time constant circuit;
   a second level decision circuit that decides on whether a second level of the wireless signal on which the second frequency limit is imposed by the second time constant circuit is higher than a prescribed second threshold or not; and
   an intermittent operation control circuit that starts the wireless signal detecting circuit, the first and second time constant circuits, and the first and second level decision circuits, in response to inputting of an intermittent operation signal that instructs starting the wireless signal detecting circuit, the first and second time constant circuits, and the first and second level decision circuits or in response to the first level decision circuit deciding that the first level of the wireless signal is higher than the prescribed first threshold.

2. The start signal generating apparatus according to claim 1, wherein
   the intermittent operation control circuit starts the wireless signal detecting circuit, first time constant circuit and the first level decision circuit in response to inputting of the intermittent operation signal that instructs the starting or in response to the first level decision circuit deciding that the first level of the wireless signal is higher than the prescribed first threshold, and starts the second time constant circuit and second level decision circuit in response to the first level decision circuit deciding that the first level of the wireless signal is higher than the prescribed first threshold.

3. The start signal generating apparatus according to claim 1, further comprising:
   a start signal output circuit that outputs the start signal in response to the second level decision circuit deciding that the second level of the wireless signal is higher than the prescribed second threshold.

4. The start signal generating apparatus according to claim 1, further comprising one or more signal processing circuits each of which comprises:
- a third time constant circuit that imposes a third frequency limit on the wireless signal detected by the wireless signal detecting circuit at a third time constant greater than the second time constant set in the second time constant circuit; and
- a third level decision circuit that decides on whether a third level of the wireless signal on which the third frequency limit is imposed by the third time constant circuit is higher than a prescribed third threshold or not, wherein
- the third time constant circuit in a post-stage signal processing circuit has a fourth time constant greater than the third time constant set in the third time constant circuit in a pre-stage signal processing circuit; and
- the post-stage signal processing circuit starts in response to the third level decision circuit in the pre-stage signal processing circuit making a decision that the third level of the wireless signal is higher than the prescribed third threshold.

5. The start signal generating apparatus according to claim 1, further comprising:
- a signal selection circuit that provides the wireless signal detecting circuit with only a wireless signal of a prescribed frequency.

6. The start signal generating apparatus according to claim 1, further comprising:
- a start signal output circuit that decides, in response to the second level decision circuit deciding that the second level of the wireless signal is higher than the prescribed second threshold, on whether a pattern included in the wireless signal matches a prescribed pattern, and outputs a start signal in response to the pattern matching the prescribed pattern.

7. The start signal generating apparatus according to claim 6, further comprising:
- a threshold control circuit that controls the first and second thresholds to be compared with the first and second levels of the wireless signal by the first and second level decision circuits in accordance with a decision result of the start signal output circuit.

8. The start signal generating apparatus according to claim 7, wherein
- the threshold control circuit increases the absolute values of the first and second thresholds to be compared with the first and second levels of the wireless signal by the first and second level decision circuits in response to the decision result of the start signal output circuit indicating that the pattern included in the wireless signal does not match the prescribed pattern by a prescribed number of times or more consecutively.

* * * * *